US012693131B2

(12) United States Patent
Yamada et al.

(10) Patent No.: US 12,693,131 B2
(45) Date of Patent: Jul. 28, 2026

(54) INFORMATION PROVISION SYSTEM, INFORMATION PROVISION METHOD, AND RECORDING MEDIUM

(71) Applicant: NEC Corporation, Tokyo (JP)

(72) Inventors: Shuei Yamada, Tokyo (JP); Shintaro Chiku, Tokyo (JP); Naoko Fukushi, Tokyo (JP); Masanori Kuki, Tokyo (JP); Shuhei Mizuguchi, Tokyo (JP); Kosei Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 35 days.

(21) Appl. No.: 18/835,472

(22) PCT Filed: Feb. 18, 2022

(86) PCT No.: PCT/JP2022/006679
§ 371 (c)(1),
(2) Date: Aug. 2, 2024

(87) PCT Pub. No.: WO2023/157239
PCT Pub. Date: Aug. 24, 2023

(65) Prior Publication Data
US 2025/0130061 A1    Apr. 24, 2025

(51) Int. Cl.
*G01C 21/00* (2006.01)
*G06V 20/52* (2022.01)
(Continued)

(52) U.S. Cl.
CPC .......... *G01C 21/3811* (2020.08); *G06V 20/52* (2022.01); *G08B 21/0476* (2013.01); *H04W 4/027* (2013.01)

(58) Field of Classification Search
None
See application file for complete search history.

(56) References Cited

U.S. PATENT DOCUMENTS

| | | | |
|---|---|---|---|
| 10,907,980 B2 * | 2/2021 | Camp ................. | B60W 40/064 |
| 2016/0220153 A1 * | 8/2016 | Annegarn ............ | A61B 5/7275 |

(Continued)

FOREIGN PATENT DOCUMENTS

| | | |
|---|---|---|
| JP | 2003-123185 A | 4/2003 |
| JP | 2013-069135 A | 4/2013 |

(Continued)

OTHER PUBLICATIONS

International Search Report for PCT Application No. PCT/JP2022/006679, mailed on Apr. 19, 2022.

(Continued)

*Primary Examiner* — Peter D Nolan
*Assistant Examiner* — Jacob Kent Besteman-Street
(74) *Attorney, Agent, or Firm* — Sughrue Mion, PLLC

(57) ABSTRACT

An information provision system according to an aspect of the present disclosure includes at least one memory configured to store instructions; and at least one processor configured to execute the instructions to: collect, from a user terminal, position information of the user terminal and behavior information indicating a movement behavior of the user terminal moving at an acceleration higher than a predetermined value; generate a danger level map representing an attention-seeking place based on a position in which the behavior information is observed on a predetermined map; and provide the danger level map to a predetermined terminal.

7 Claims, 18 Drawing Sheets

(51) Int. Cl.
    *G08B 21/04*        (2006.01)
    *H04W 4/02*        (2018.01)

(56)              References Cited

U.S. PATENT DOCUMENTS

| | | | |
|---|---|---|---|
| 2017/0328726 A1* | 11/2017 | Matsuzawa | G09B 29/10 |
| 2018/0177436 A1* | 6/2018 | Chang | A61B 5/1101 |
| 2019/0049256 A1 | 2/2019 | Camp et al. | |
| 2020/0265701 A1* | 8/2020 | Schenker | G01C 21/36 |
| 2021/0104154 A1* | 4/2021 | Yokoyama | G08G 1/01 |
| 2022/0051540 A1* | 2/2022 | Tanaka | G06V 40/20 |
| 2023/0393591 A1* | 12/2023 | Gordon | G06V 10/82 |

FOREIGN PATENT DOCUMENTS

| | | | |
|---|---|---|---|
| JP | 2014-154005 A | | 8/2014 |
| JP | 2017090953 A | * | 5/2017 |
| JP | 2018-132551 A | | 8/2018 |
| JP | 2019101473 A | * | 6/2019 |
| JP | 2020-166428 A | | 10/2020 |
| JP | 2021-071328 A | | 5/2021 |

OTHER PUBLICATIONS

English translation of Written opinion for PCT Application No. PCT/JP2022/006679, mailed on Apr. 19, 2022.

\* cited by examiner

INFORMATION PROVISION SYSTEM, INFORMATION PROVISION METHOD, AND RECORDING MEDIUM

This application is a National Stage Entry of PCT/JP2022/006679 filed on Feb. 18, 2022, the contents of all of which are incorporated herein by reference, in their entirety.

TECHNICAL FIELD

The present disclosure relates to an information provision system, a user terminal, a danger level map provision system, an information provision method, and a recording medium.

BACKGROUND ART

PTL 1 discloses an information processing device that includes a position information acquisition unit for acquiring position information, a geographic characteristic calculation unit for calculating a geographic characteristic based on information obtained from a sensor, and a storage unit for storing the position information and the geographic characteristic in association with each other, and generates a map.

PTL 2 discloses a slipping information output system that detects a slipping state of a vehicle based on a satellite positioning speed, sets a caution section, and notifies a vehicle passing through the caution section.

CITATION LIST

Patent Literature

PTL 1: JP 2018-132551 A
PTL 2: JP 2020-166428 A

SUMMARY OF INVENTION

Technical Problem

In the information processing device of PTL 1, a map associated with a geographic characteristic including the slope of the road, the presence of stairs, and the like can be generated based on behavior information of a user, but there is a problem that it is not possible to convey a potential danger on the road or the stairs. Even with the slipping information output system of PTL 2, it is not possible to provide a problem or the like of a sidewalk that causes falling, slipping, stumbling, or the like of a pedestrian.

An object of the present disclosure in an example aspect is to provide an information provision system, a user terminal, a danger level map provision system, an information provision method, and a recording medium that are capable of contributing to the improvement in the safety of a pedestrian moving in a predetermined area.

Solution to Problem

According to a first viewpoint, an information provision system including a collection means for collecting, from a user terminal, position information of the user terminal and behavior information indicating a behavior accompanied with a predetermined or higher acceleration of the user terminal, a map generation means for generating a danger level map representing an attention-seeking place based on a position in which the behavior information is observed on a predetermined map, and a map provision means for providing the danger level map to a predetermined terminal is provided.

According to a second viewpoint, a user terminal including a position information acquisition means and an acceleration sensor, in which position information and behavior information indicating a behavior accompanied with a predetermined or higher acceleration are transmitted to the information provision system described above is provided.

According to a third viewpoint, a danger level map provision system including the information provision system described above and the user terminal described above is provided.

According to a fourth viewpoint, an information provision method including collecting, from a user terminal described above, position information of the user terminal and behavior information indicating a behavior accompanied with a predetermined or higher acceleration of the user terminal, generating a danger level map representing an attention-seeking place based on a position in which the behavior information is observed on a predetermined map, and providing the danger level map to a predetermined terminal is provided.

According to a fifth aspect, a computer-readable recording medium recording a program for causing an information provision system to execute processing of collecting, from a user terminal, position information of the user terminal and behavior information indicating a behavior accompanied with a predetermined or higher acceleration of the user terminal, processing of generating a danger level map representing an attention-seeking place based on a position in which the behavior information is observed on a predetermined map, and processing of providing the danger level map to a predetermined terminal is provided.

Advantageous Effects of Invention

According to an example aspect of the present disclosure, the information provision system, the user terminal, the danger level map provision system, the information provision method, and the recording medium that are capable of contributing to the improvement of the safety of the pedestrian moving in the predetermined area are provided.

3

Figure 8:
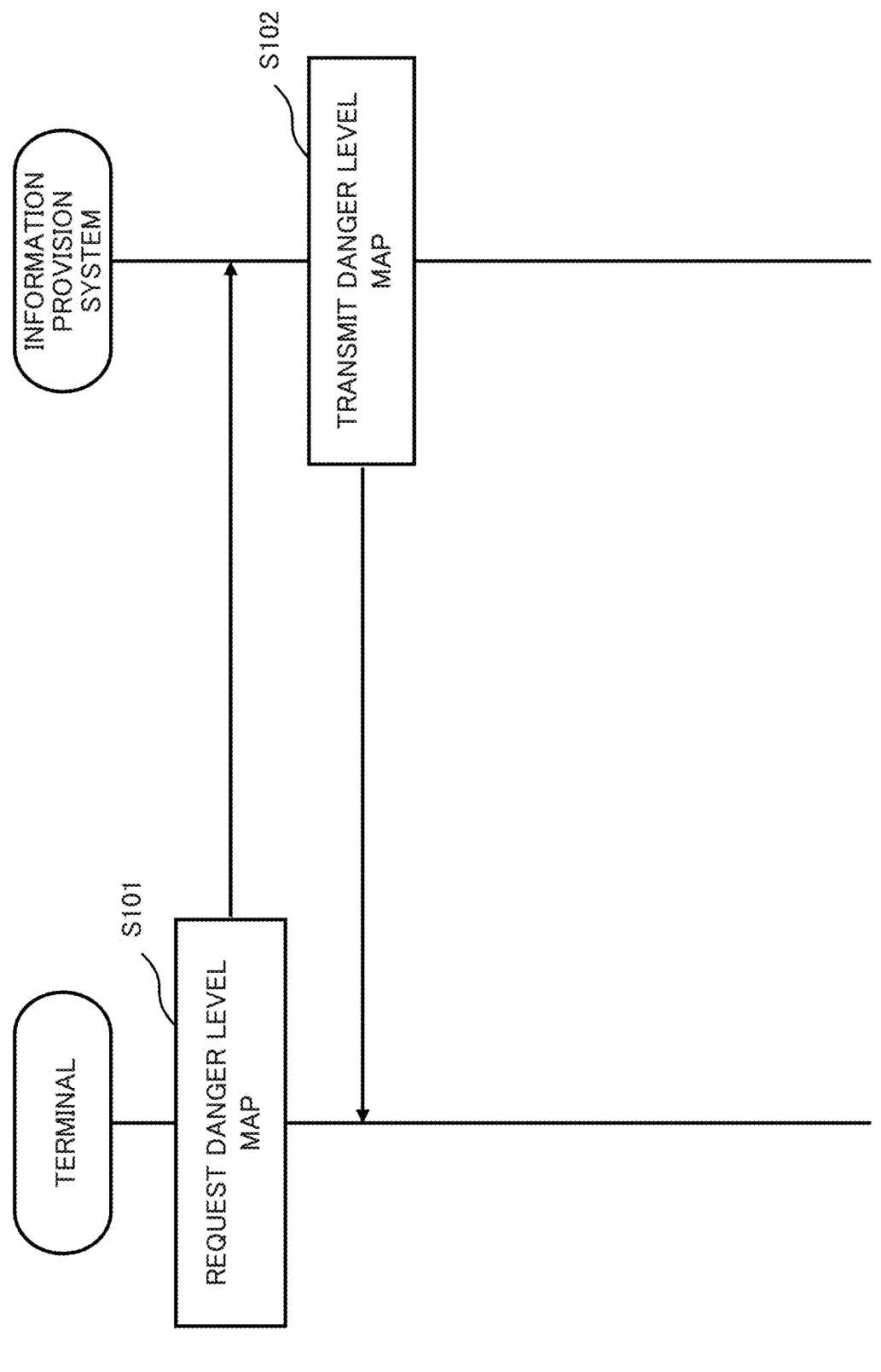

FIG. 8 is a sequence diagram illustrating an operation (a provision of the danger level map) of the danger level map provision system according to one example embodiment of the present disclosure.

Figure 9:
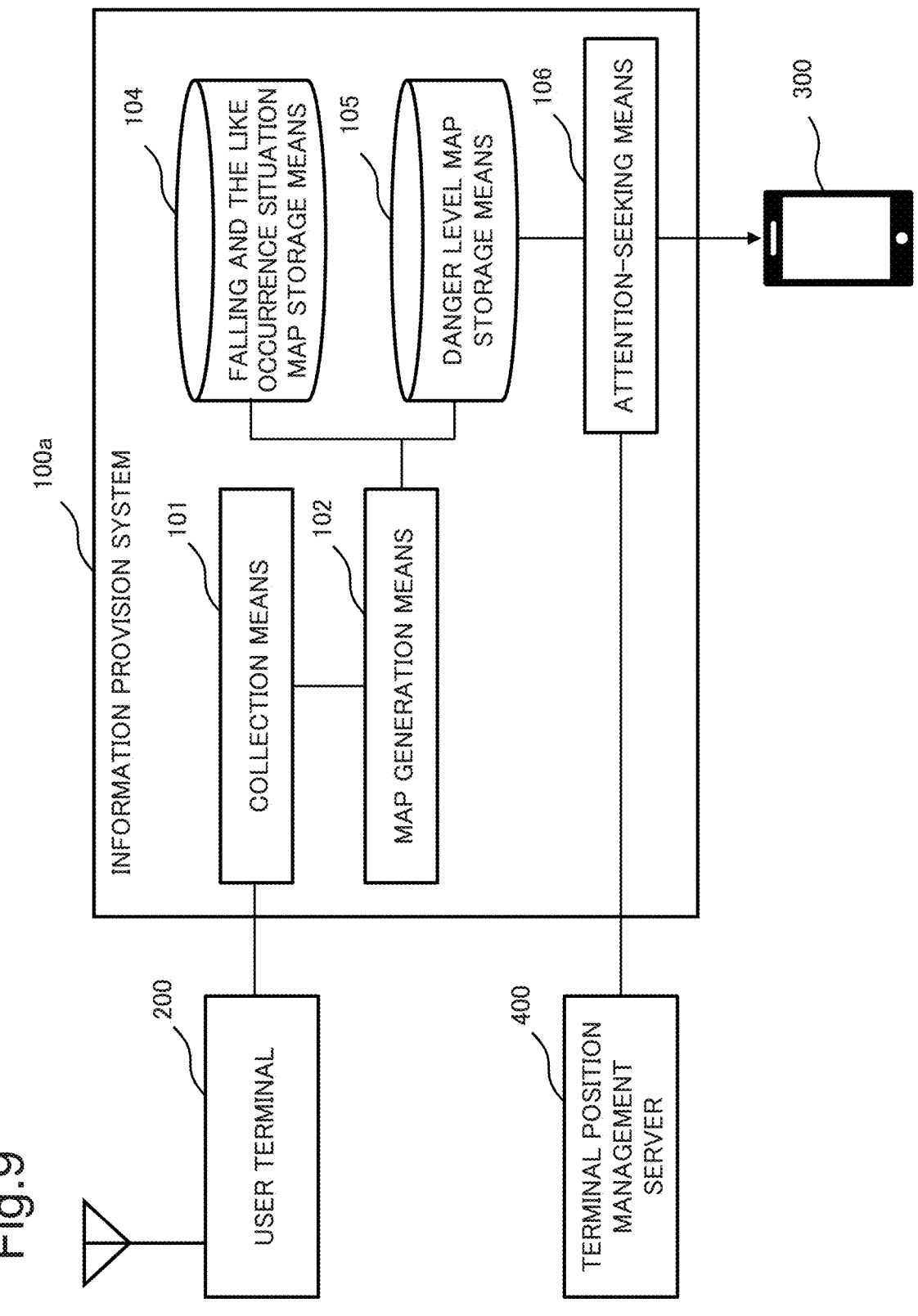

FIG. 9 is a diagram illustrating a configuration of a danger level map provision system according to one example embodiment of the present disclosure.

Figure 10:
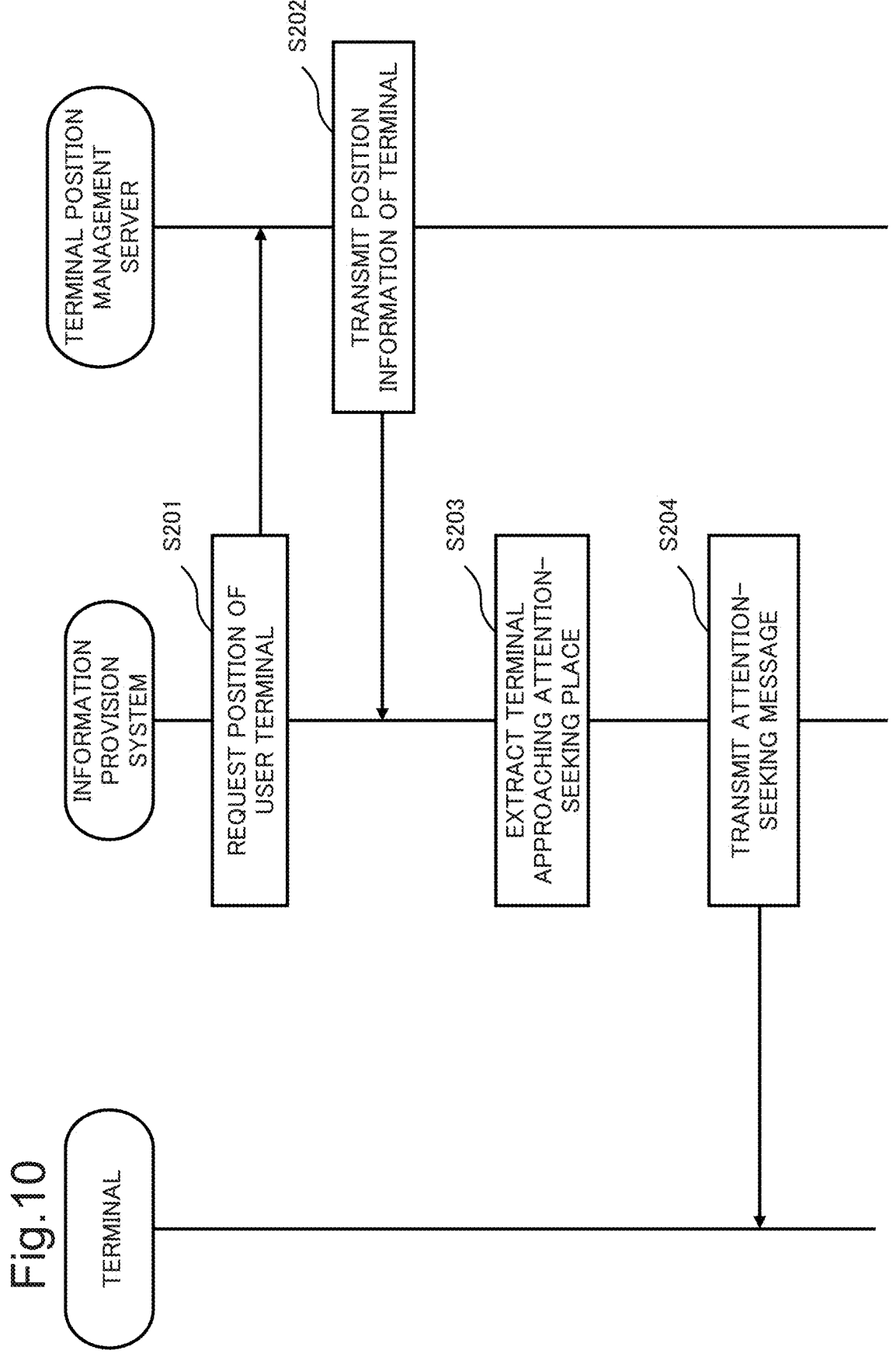

FIG. 10 is a sequence diagram illustrating an operation (an attention-seeking operation based on a danger level map) of a danger level map provision system according to one example embodiment of the present disclosure.

Figure 11:
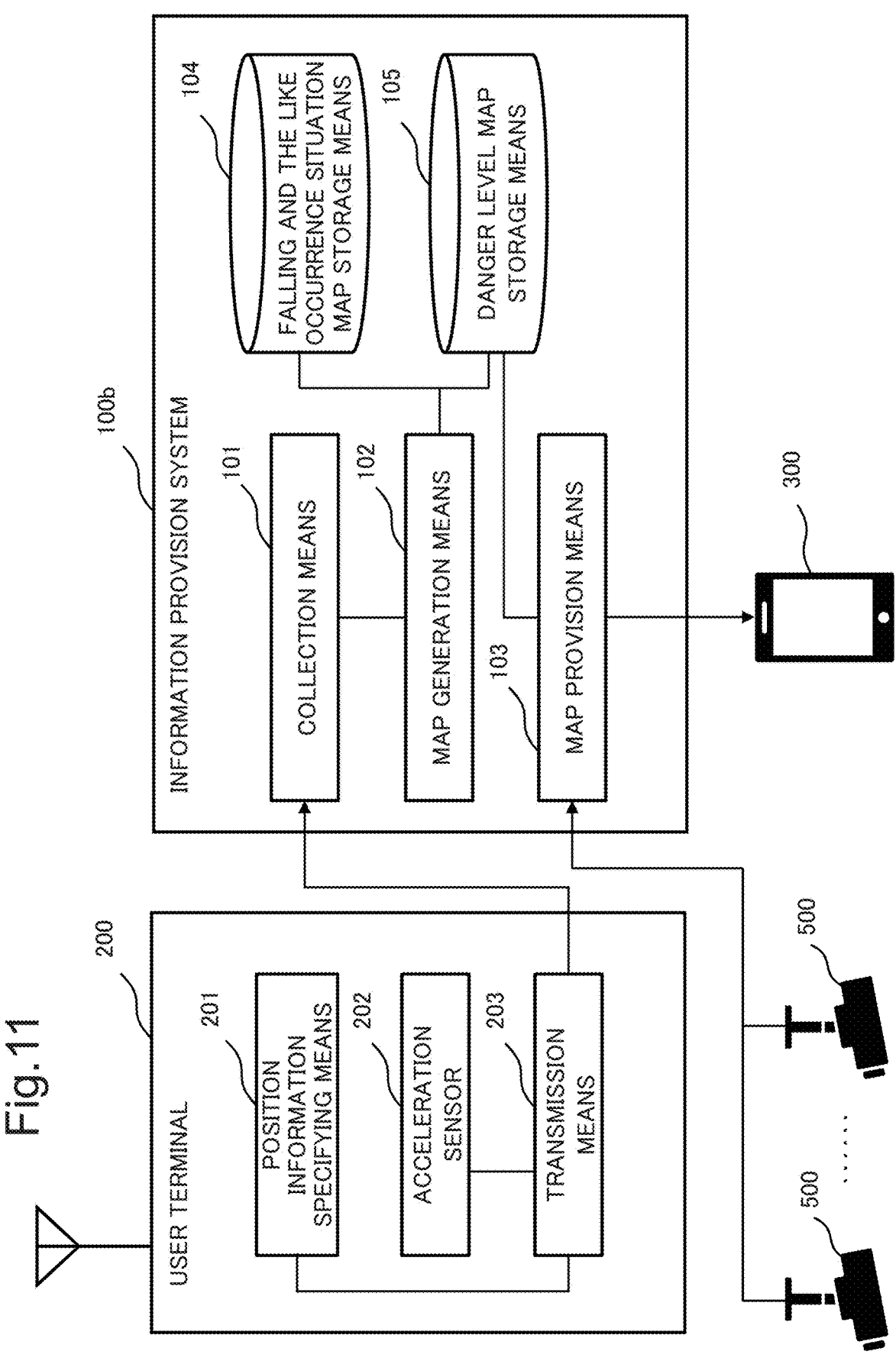

FIG. 11 is a diagram illustrating a configuration of a danger level map provision system according to one example embodiment of the present disclosure.

Figure 12:
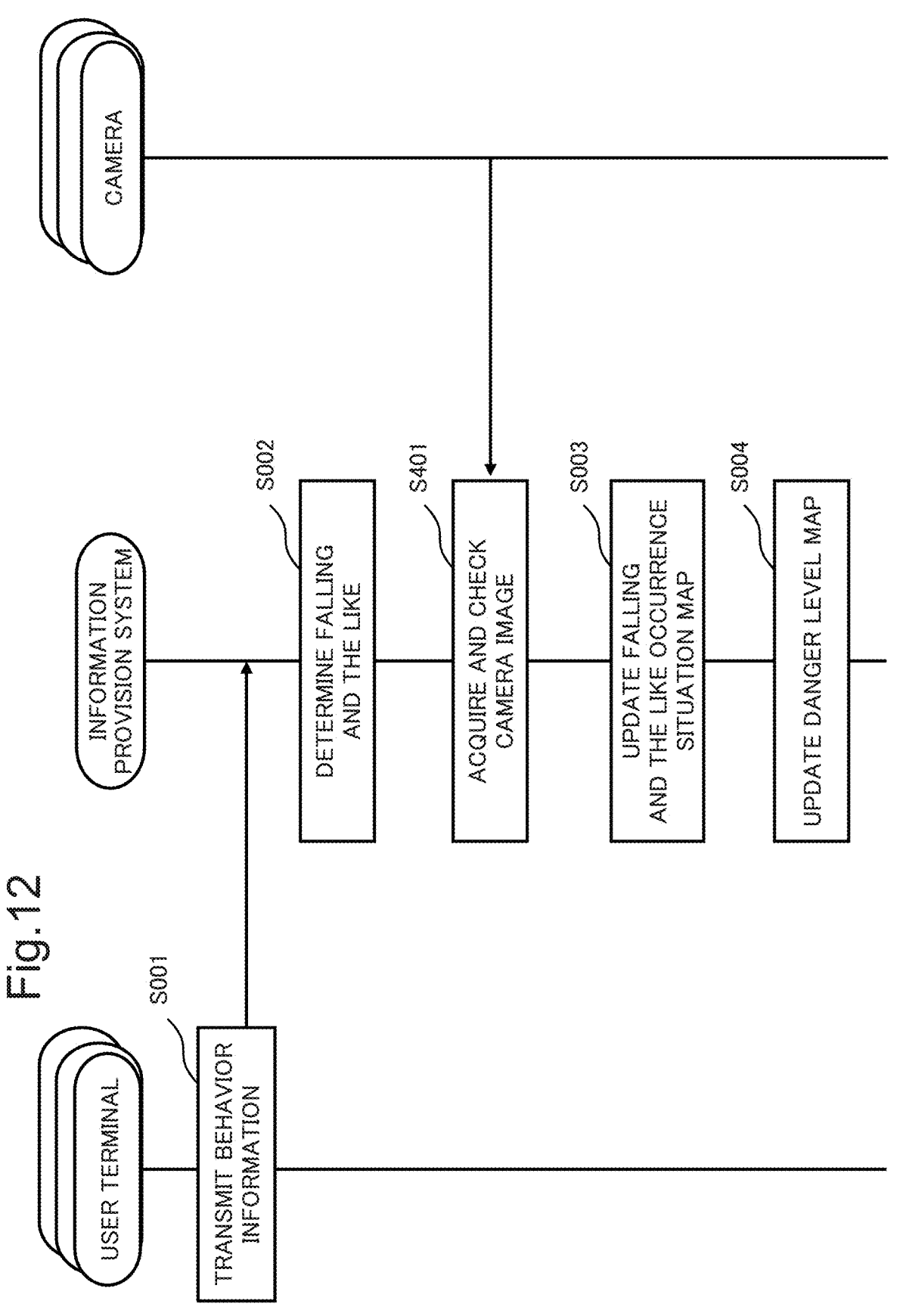

FIG. 12 is a sequence diagram illustrating an operation (an update of the danger level map) of the danger level map provision system according to one example embodiment of the present disclosure.

Figure 13:
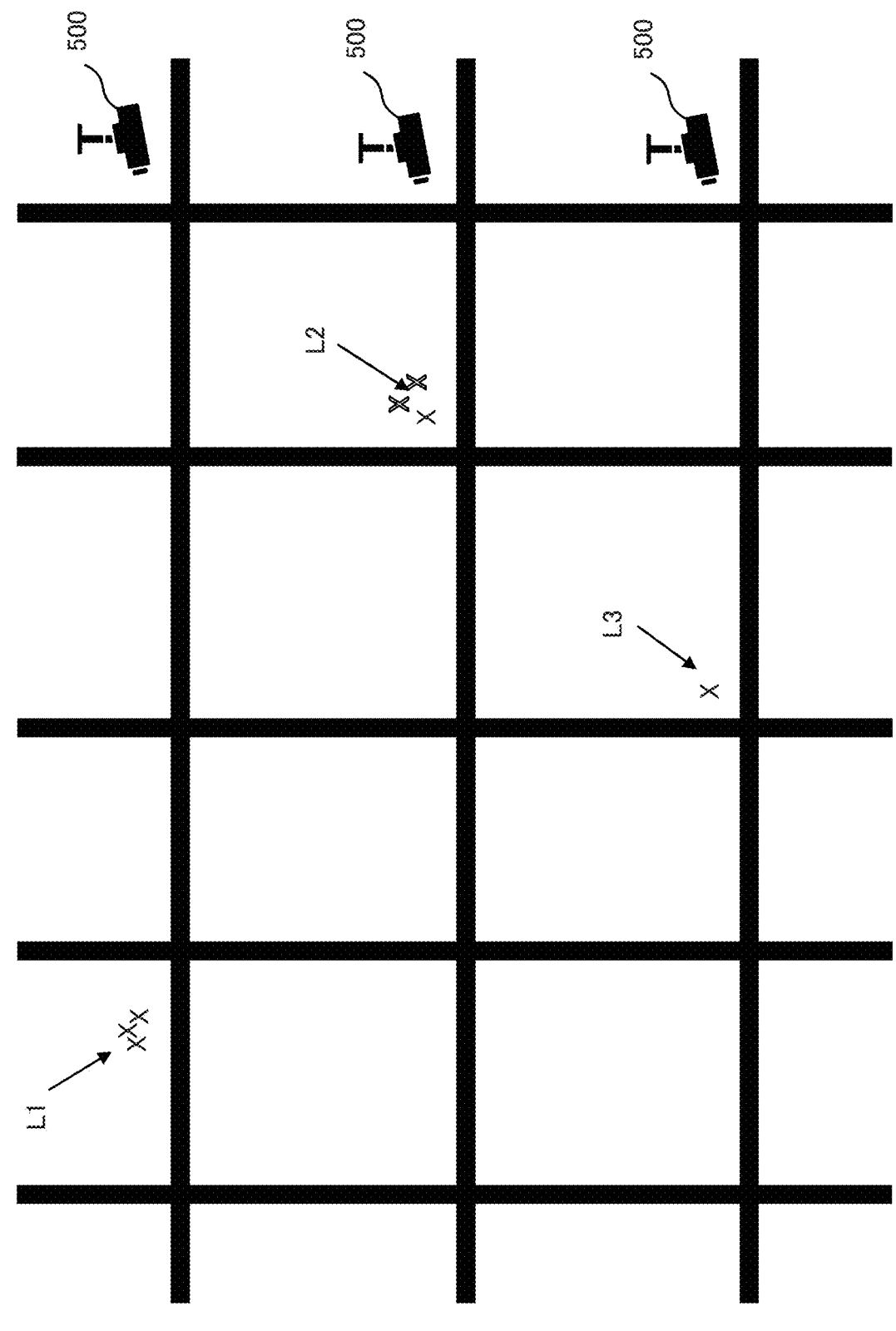

FIG. 13 is a diagram illustrating an example of a falling and the like occurrence situation map managed by an information provision system according to one example embodiment of the present disclosure.

Figure 14:
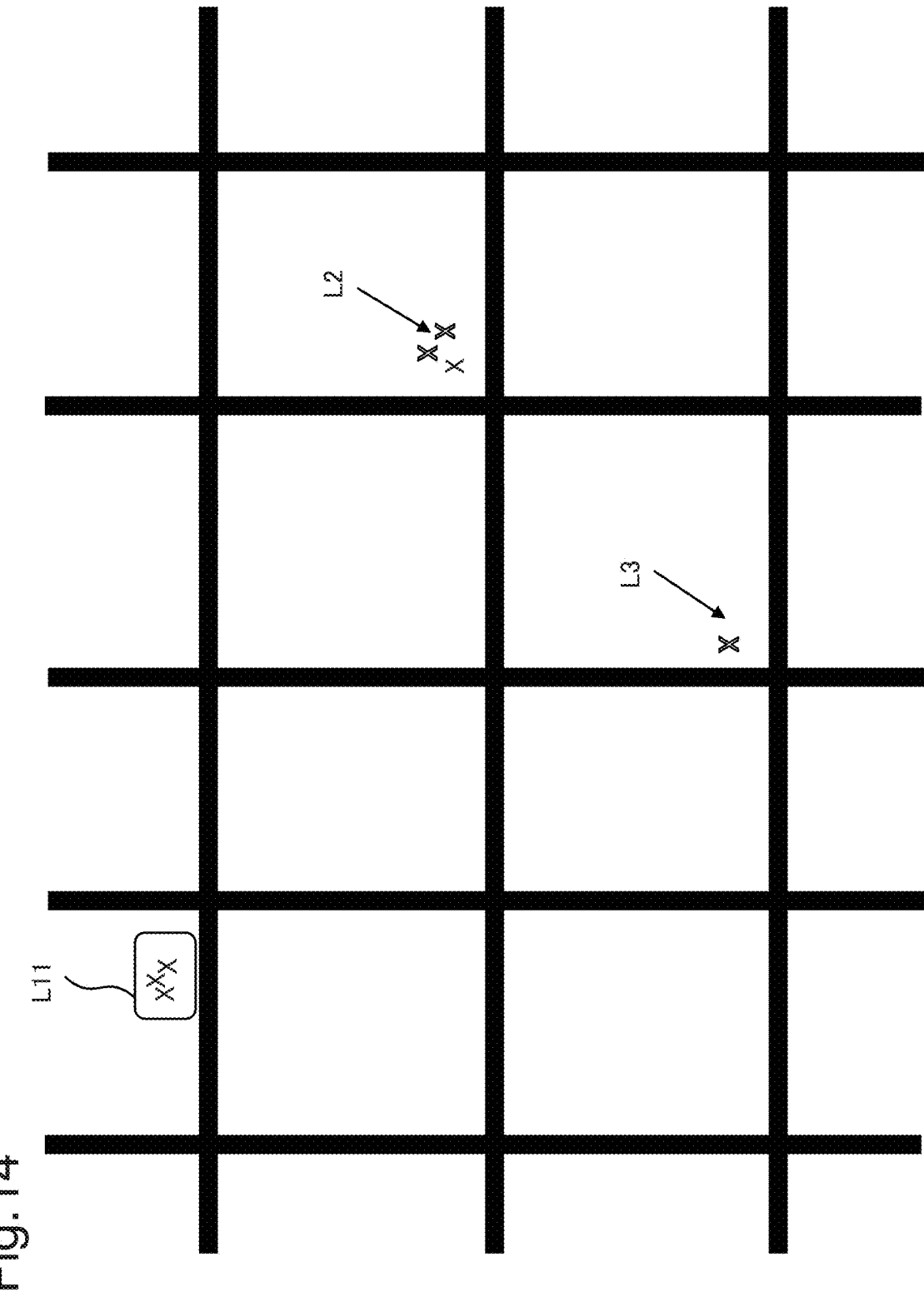

FIG. 14 is a diagram illustrating an example of the danger level map provided by the information provision system according to one example embodiment of the present disclosure.

Figure 15:
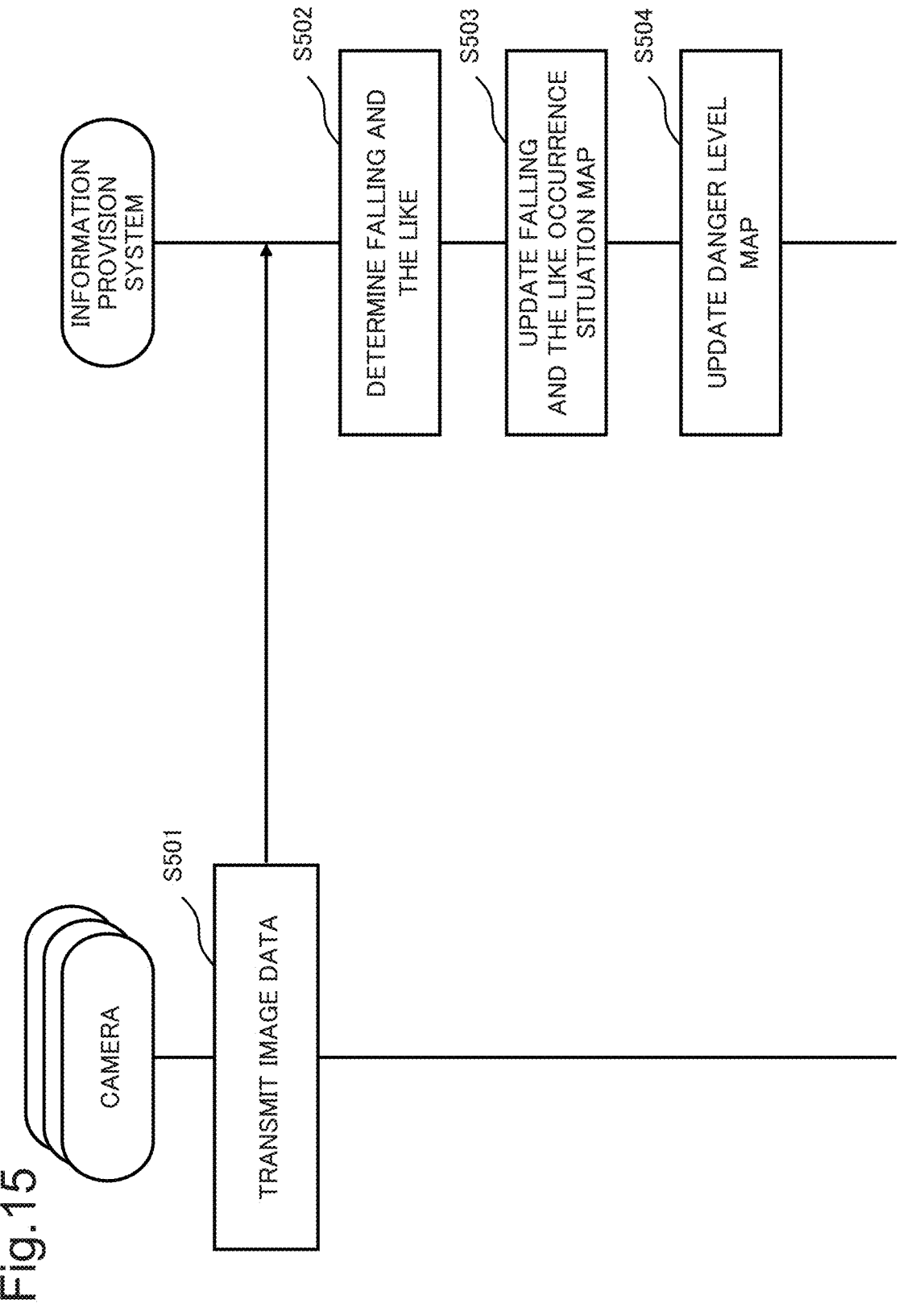

FIG. 15 is a sequence diagram illustrating an operation (an update of a danger level map) of a danger level map provision system according to one example embodiment of the present disclosure.

Figure 16:
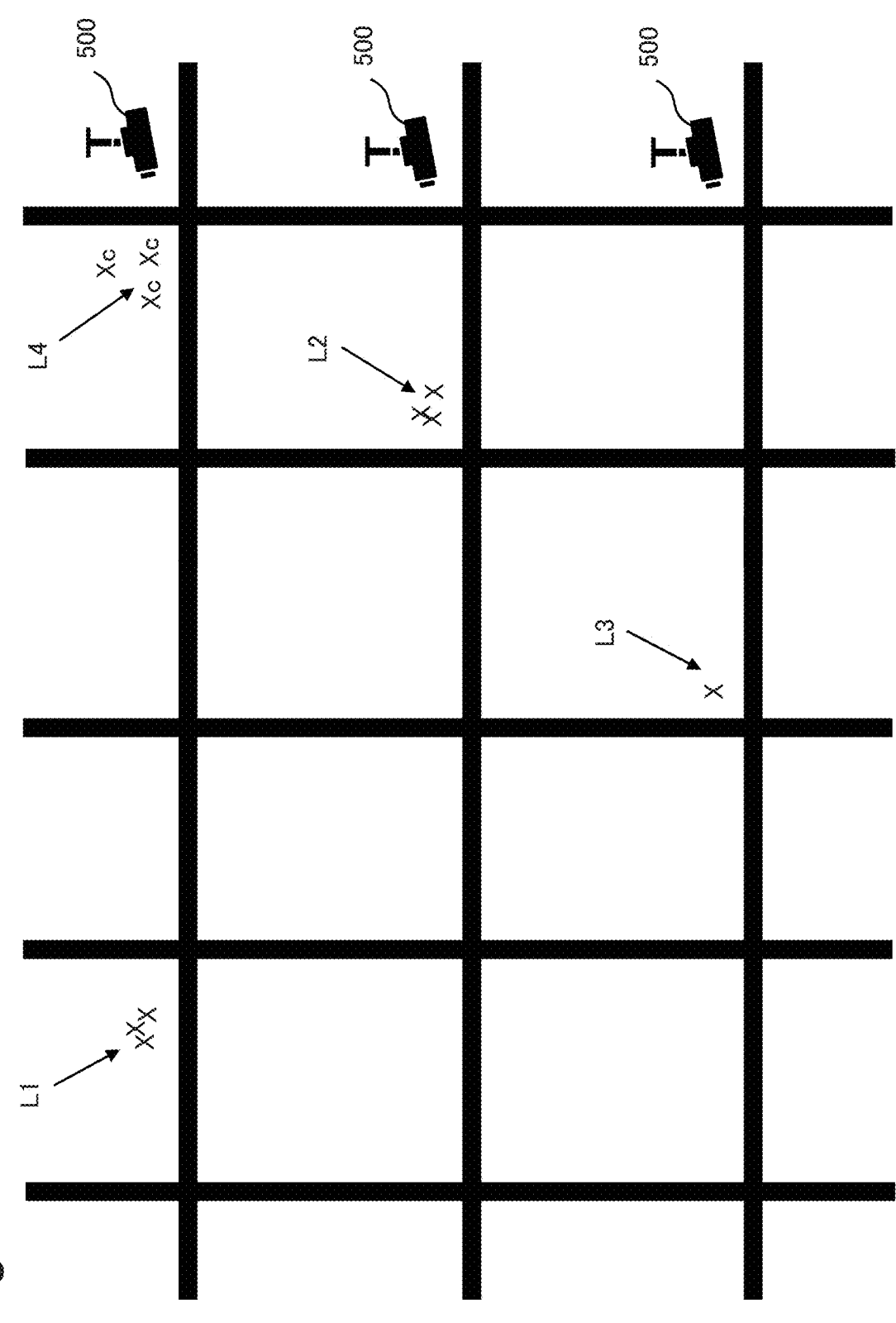

FIG. 16 is a diagram illustrating an example of a falling and the like occurrence situation map managed by an information provision system according to one example embodiment of the present disclosure.

Figure 17:
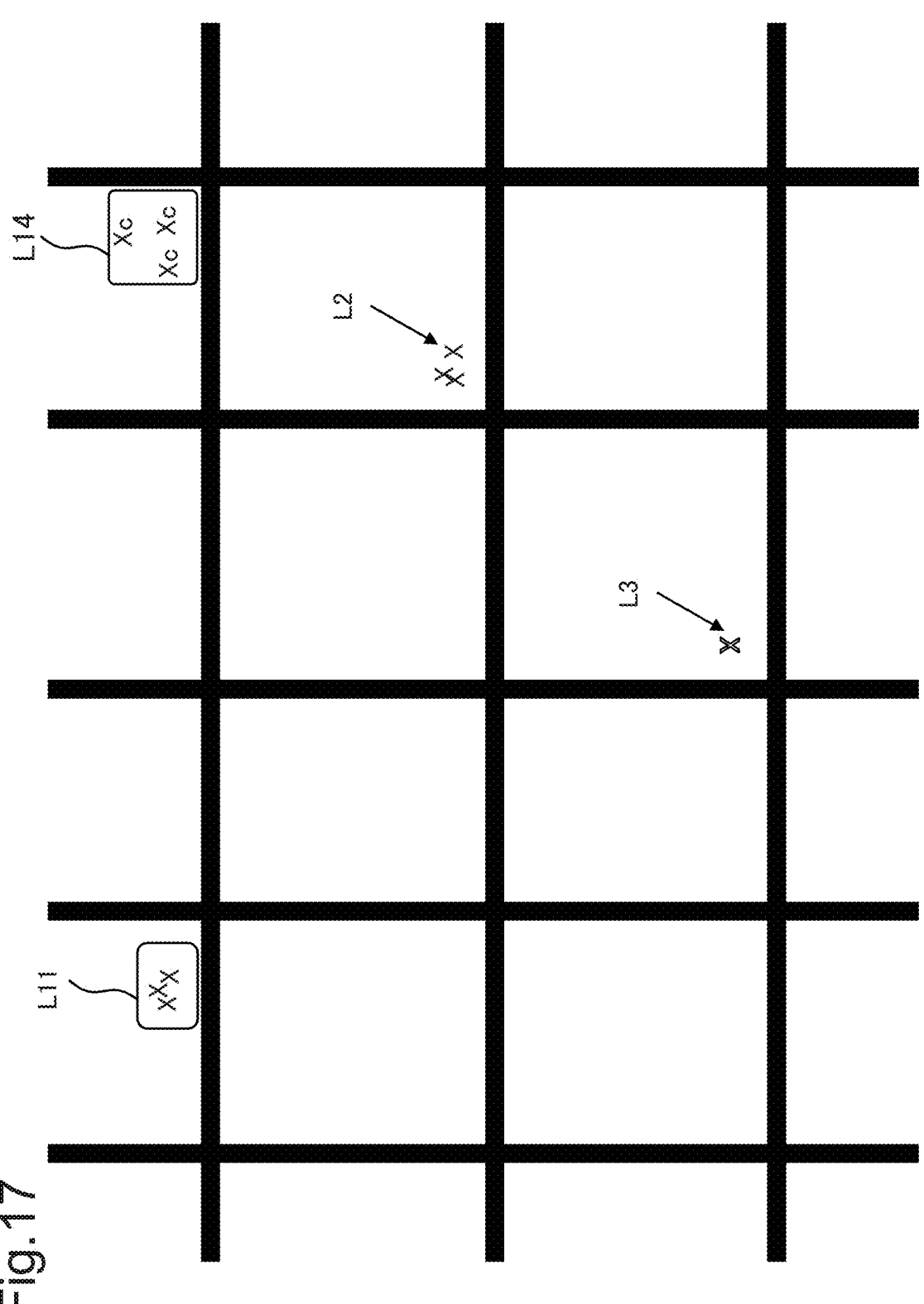

FIG. 17 is a diagram illustrating another example of the danger level map provided by the information provision system according to one example embodiment of the present disclosure.

Figure 18:
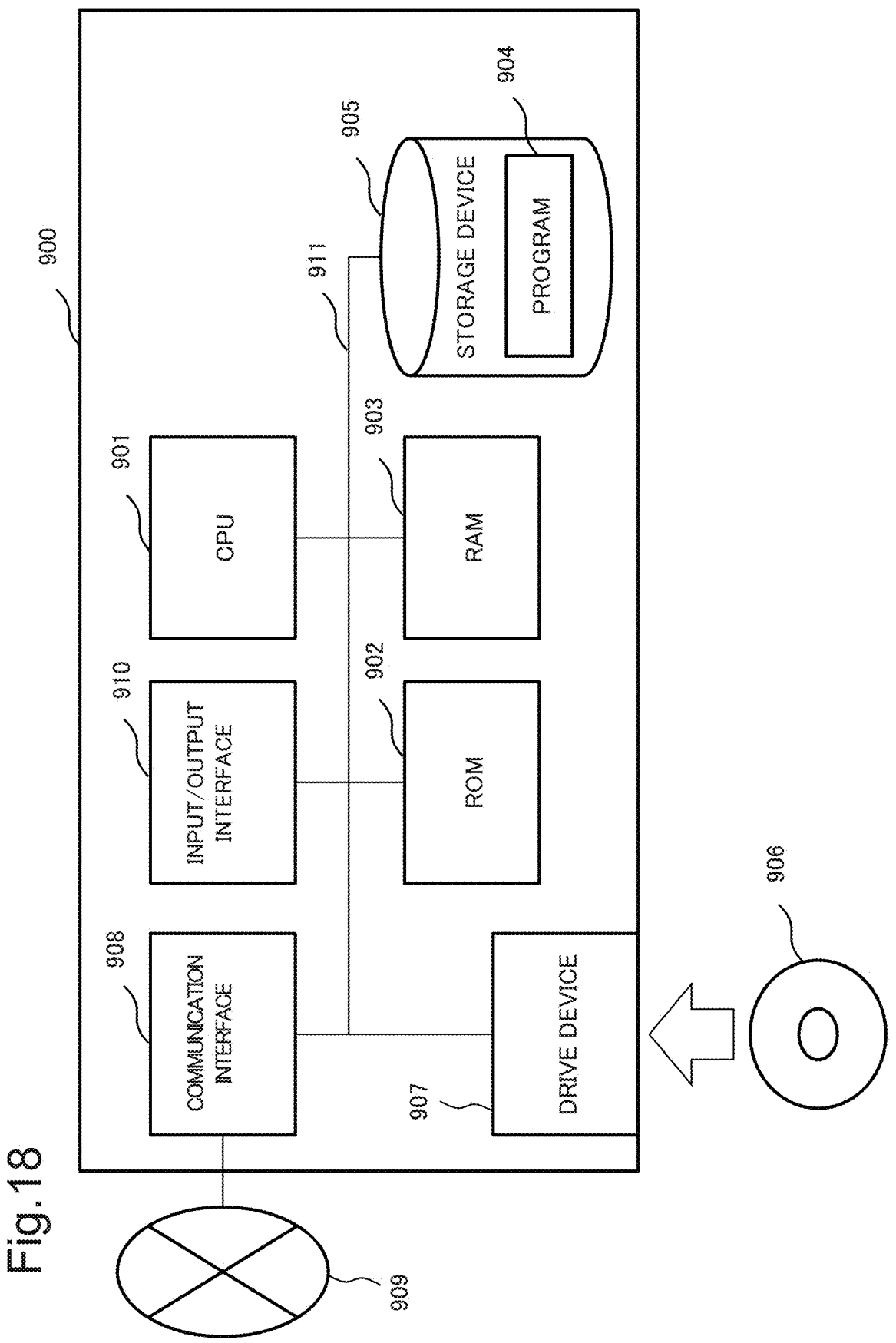

FIG. 18 is a diagram illustrating a configuration of a computer configuring the information provision system of the present disclosure.

EXAMPLE EMBODIMENTS

First, the outline of one example embodiment of the present invention will be described with reference to the drawings. The reference numerals in the drawings applied to the outline are applied to each element for convenience as an example for easy understanding, and are not intended to limit the present invention to the illustrated aspects. Connection lines between blocks in the drawings and the like referred to in the following description include both of a bidirectional line and a unidirectional line. A unidirectional arrow schematically indicates the flow of a main signal (data), and does not exclude bidirectionality. A program is executed via a computer device, and the computer device includes, for example, a processor, a storage device, an input device, a communication interface, and a display device as necessary. The computer device is configured to be capable of communicating with a device (including a computer) inside or outside the device via the communication interface regardless of a wired manner or a wireless manner. There are ports and interfaces at connection points of the input and output of each block in the drawings, but the illustration of the ports and the interfaces is omitted.

Figure 1:
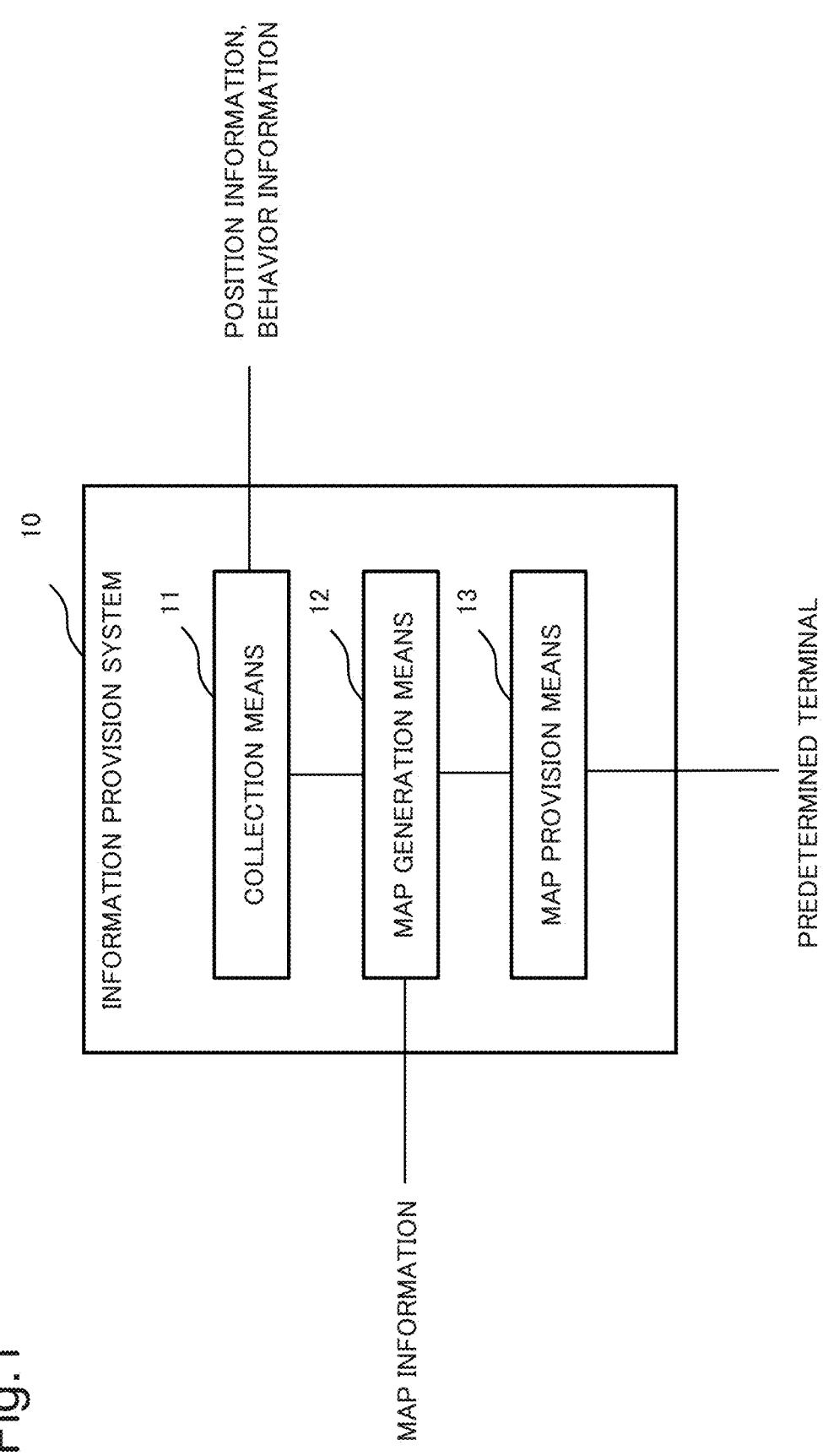
FIG. 1 is a diagram illustrating a configuration of one example embodiment of the present disclosure.

In one example embodiment of the present invention, as illustrated in FIG. 1, the present invention can be enabled by an information provision system 10 including a collection means 11, a map generation means 12, and a map provision means 13.

Figure 2:
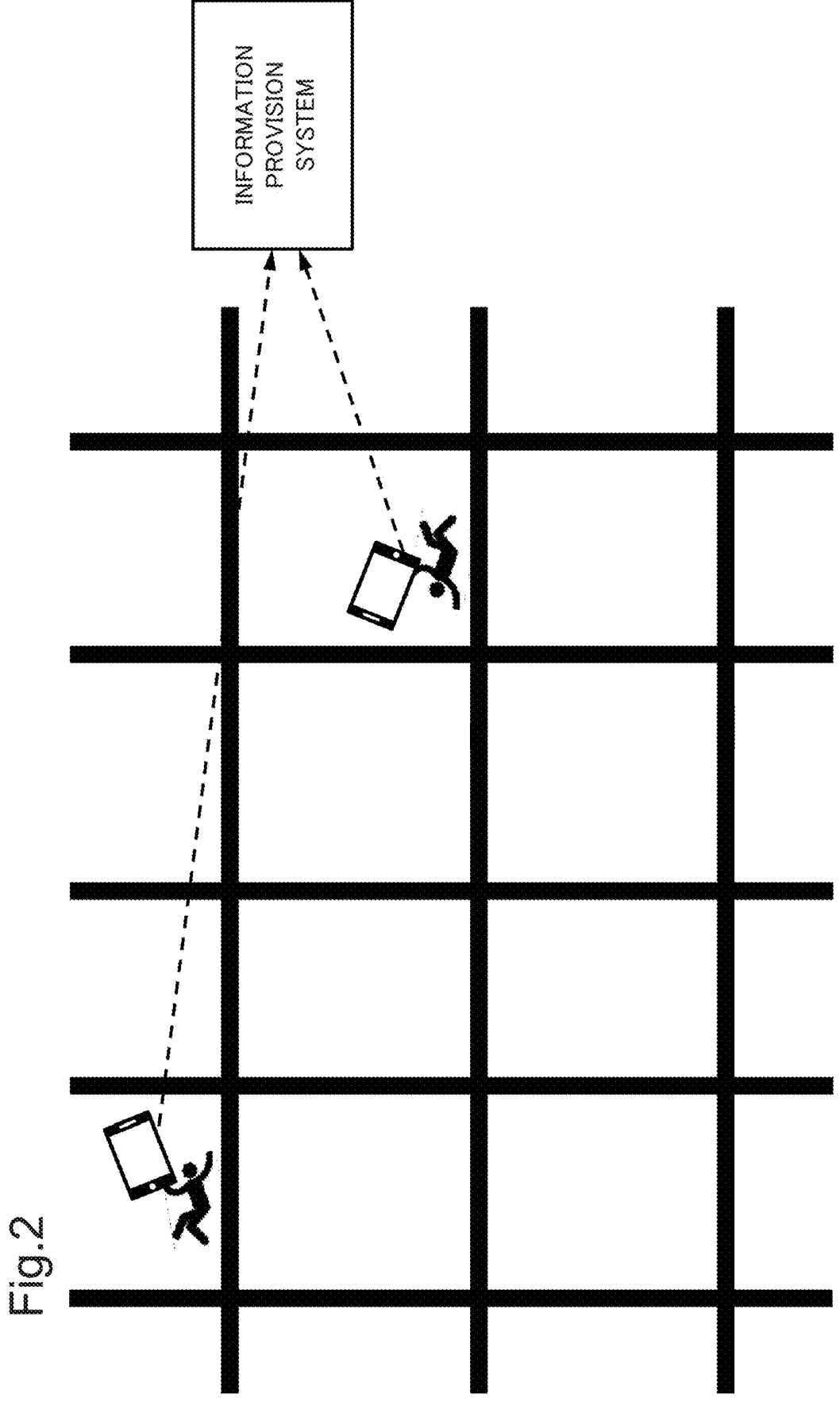
FIG. 2 is a diagram for describing an operation of one example embodiment of the present disclosure.

More specifically, the collection means 11 collects, from a user terminal, position information of the user terminal and behavior information indicating a behavior accompanied with a predetermined or higher acceleration of the user terminal. For example, as illustrated in FIG. 2, the collection means 11 collects the behavior information and the position information indicating a falling position from the user terminal carried by a user who has fallen.

Figure 3:
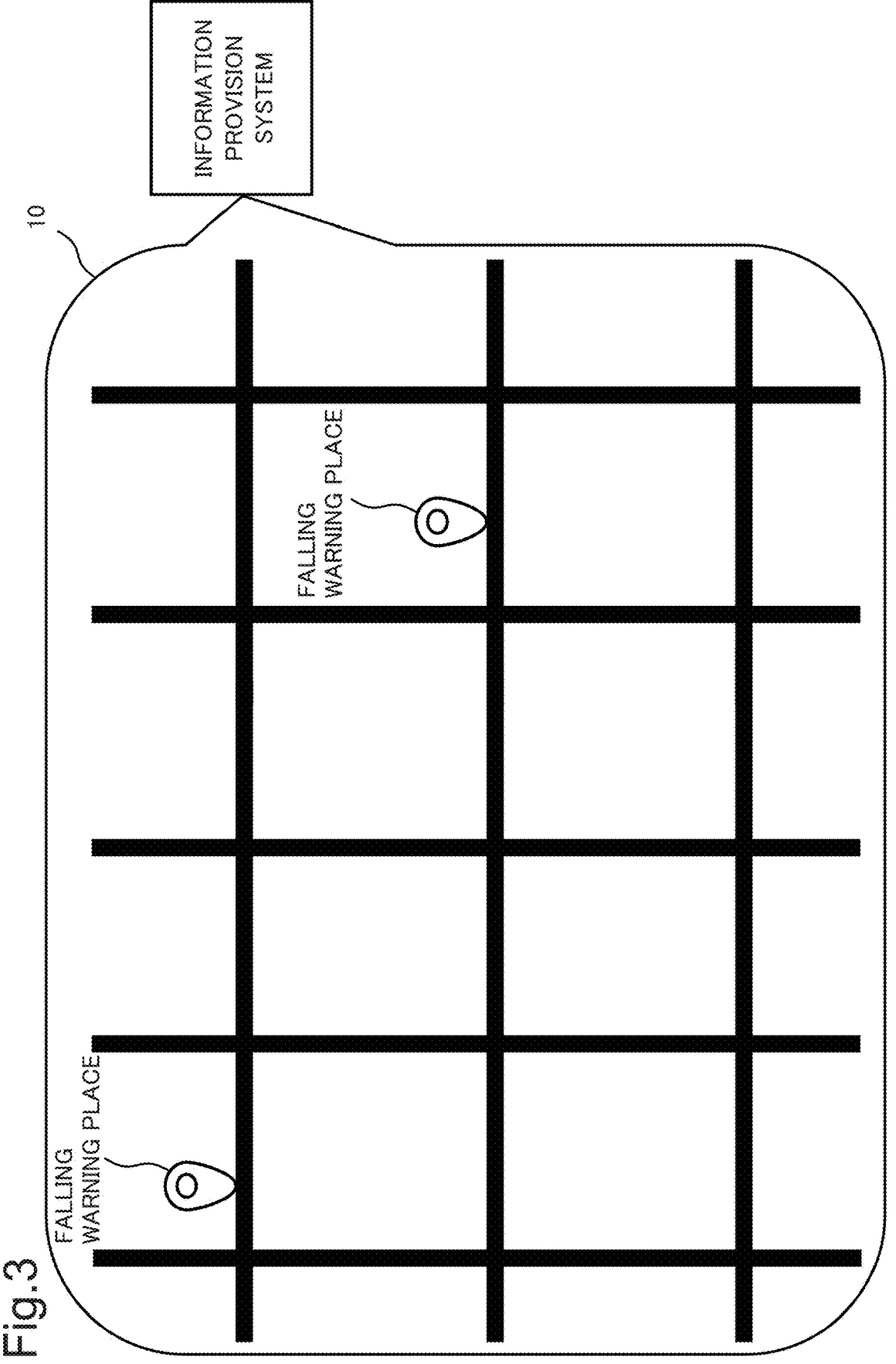
FIG. 3 is a diagram for describing an operation of one example embodiment of the present disclosure.

The map generation means 12 generates a danger level map representing an attention-seeking place based on a position in which the behavior information is observed on a predetermined map. In a case where the behavior information as illustrated in FIG. 2 is obtained, the map generation means 12 generates, as illustrated in FIG. 3, a danger level map representing a place in which the falling of the user has occurred as the attention-seeking place (a "falling warning place" in FIG. 2). The "predetermined map" may be held by the information provision system 10, or the information provision system 10 may acquire a map from an external map server or the like.

The map provision means 13 provides the danger level map to a predetermined terminal. The predetermined terminal may be a user terminal of a pedestrian passing through an area included in the danger level map, a terminal of an administrator who manages a road or a sidewalk represented in the danger level map, or the like.

The user (the pedestrian) who has browsed the danger level map refers to the number and distribution of falling warning places in a route to a destination, and pays attention when changing the route or passing through the corresponding place. Accordingly, the safety of the pedestrian who is moving in a predetermined area is improved.

As a mechanism in which the user terminal described above transmits the position information and the behavior information to the information provision system 10, an application program for causing the user terminal to transmit such pieces of data may be installed and operated. Such an application program may be a dedicated application program, but may be enabled as one function of a widely spread application program. As such an application program, a pedometer application program, a map browsing application program, and the like can be considered.

The user terminal described above is not particularly limited as long as the user terminal has an acceleration sensor and a position information acquisition function. For example, a smart phone, a smart watch, or the like can be used as the user terminal of the present invention.

First Example Embodiment

Figure 4:
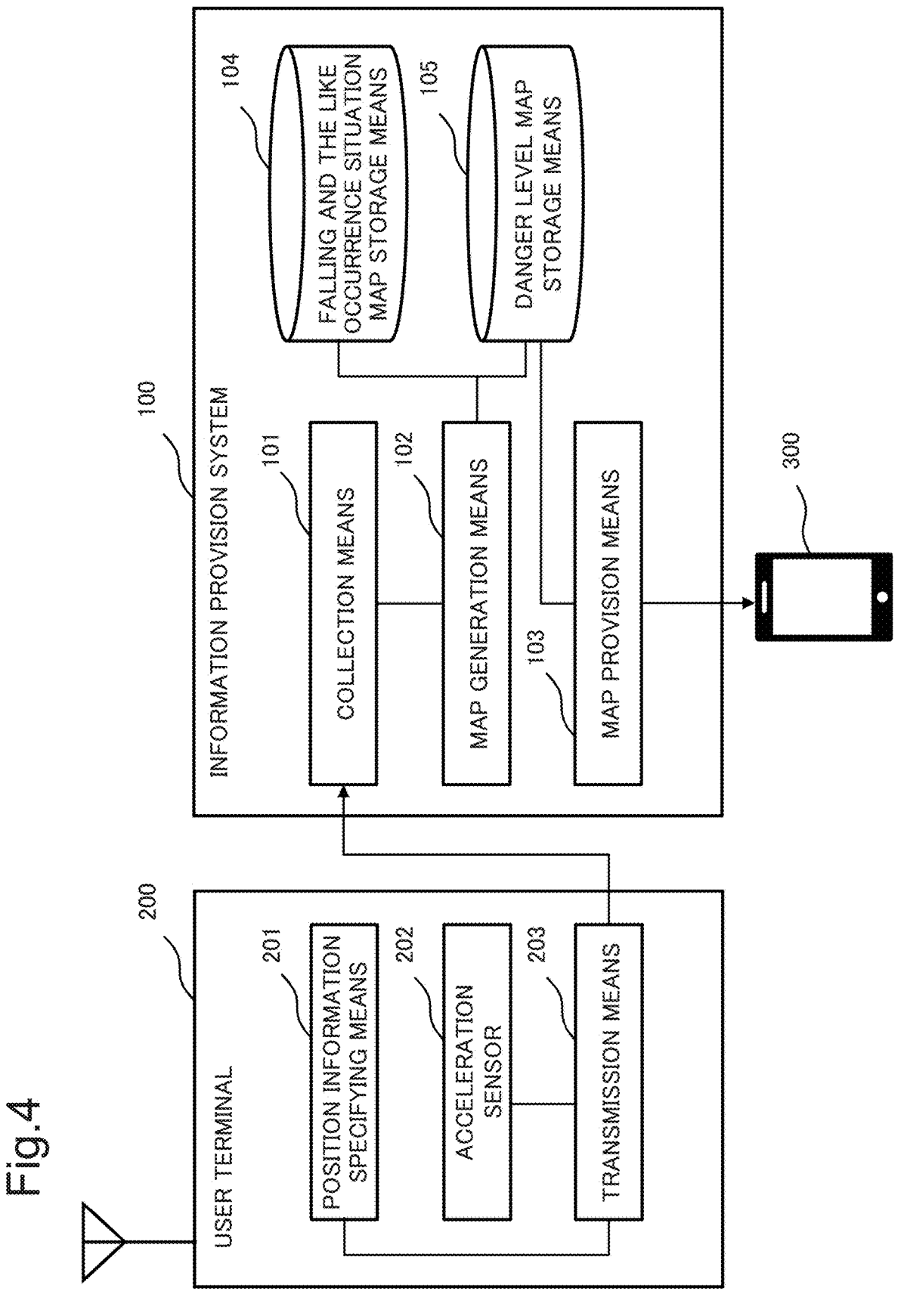
FIG. 4 is a diagram illustrating a configuration of a danger level map provision system according to one example embodiment of the present disclosure.

Next, a first example embodiment in which a danger level map is generated based on a falling and the like occurrence situation in a past certain period will be described in detail with reference to the drawings. FIG. 4 is a diagram illustrating the configuration of a danger level map provision system according to the first example embodiment of the present invention. Referring to FIG. 4, a configuration including a user terminal 200, an information provision system 100, and a terminal 300 to which a danger level map is provided is illustrated.

The user terminal 200 includes a position information specifying means 201, an acceleration sensor 202, and a transmission means 203. The position information specifying means 201 is a position information acquisition means for specifying the position of the user terminal, and for example, a global positioning system (GPS) or the like can be used.

The acceleration sensor 202 is a sensor for measuring an acceleration that occurs in the user terminal. For example, an acceleration sensor used for a pedometer function, a game function, or the like of the user terminal can be used.

When a change in acceleration of a predetermined magnitude or more appears in the acceleration sensor 202, the transmission means 203 transmits the position information measured by the position information specifying means 201, and the behavior information to the information provision system 100. The behavior information may include data indicating a temporal change in the acceleration in the past certain period measured by the acceleration sensor 202. On a program side configuring the transmission means 203 of the user terminal 200, it may be determined that the user has fallen, slipped, or stumbled, and the determination result may be transmitted as the behavior information. The transmission means 203 may suppress the transmission of the behavior information in a state where the user is boarding a vehicle or the like. As a method for determining whether the user is boarding the vehicle or the like, the speed of the user terminal 200 (whether the speed is equal to or higher than a certain speed), the position information of the user terminal 200 (whether the user is on a roadway), the explicit manipulation of the user (setting whether to transmit the behavior information), and the like can be used.

The information provision system 100 includes a collection means 101, a map generation means 102, a map provision means 103, a falling and the like occurrence situation map storage means 104, and a danger level map storage means 105.

When receiving the position information and the behavior information from the user terminal 200, the collection means 101 sends the received position information and behavior information to the map generation means 102.

When receiving the position information and the behavior information, the map generation means 102 analyzes the behavior information, and determines whether the motion of the user is any of falling, slipping, and stumbling (hereinafter, also referred to as "falling and the like" unless otherwise distinguished). Here, in a case where it is determined that the motion of the user is not the falling, the slipping, or the stumbling, the map generation means 102 discards the behavior information. In the determination, the map generation means 102 may remove the behavior information from the user terminal 200 of the user who is boarding the vehicle or the like. As the method for determining whether the user is boarding the vehicle or the like, the speed of the user terminal 200 (whether the speed is equal to or higher than the certain speed), the position information of the user terminal (whether the user is on the roadway), and the like can be used.

On the other hand, when determining that the motion of the user is any one of the falling, the slipping, and the stumbling, the map generation means 102 records the occurrence position of the falling and the like in a falling and the like occurrence situation map of the falling and the like occurrence situation map storage means 104.

Figure 5:
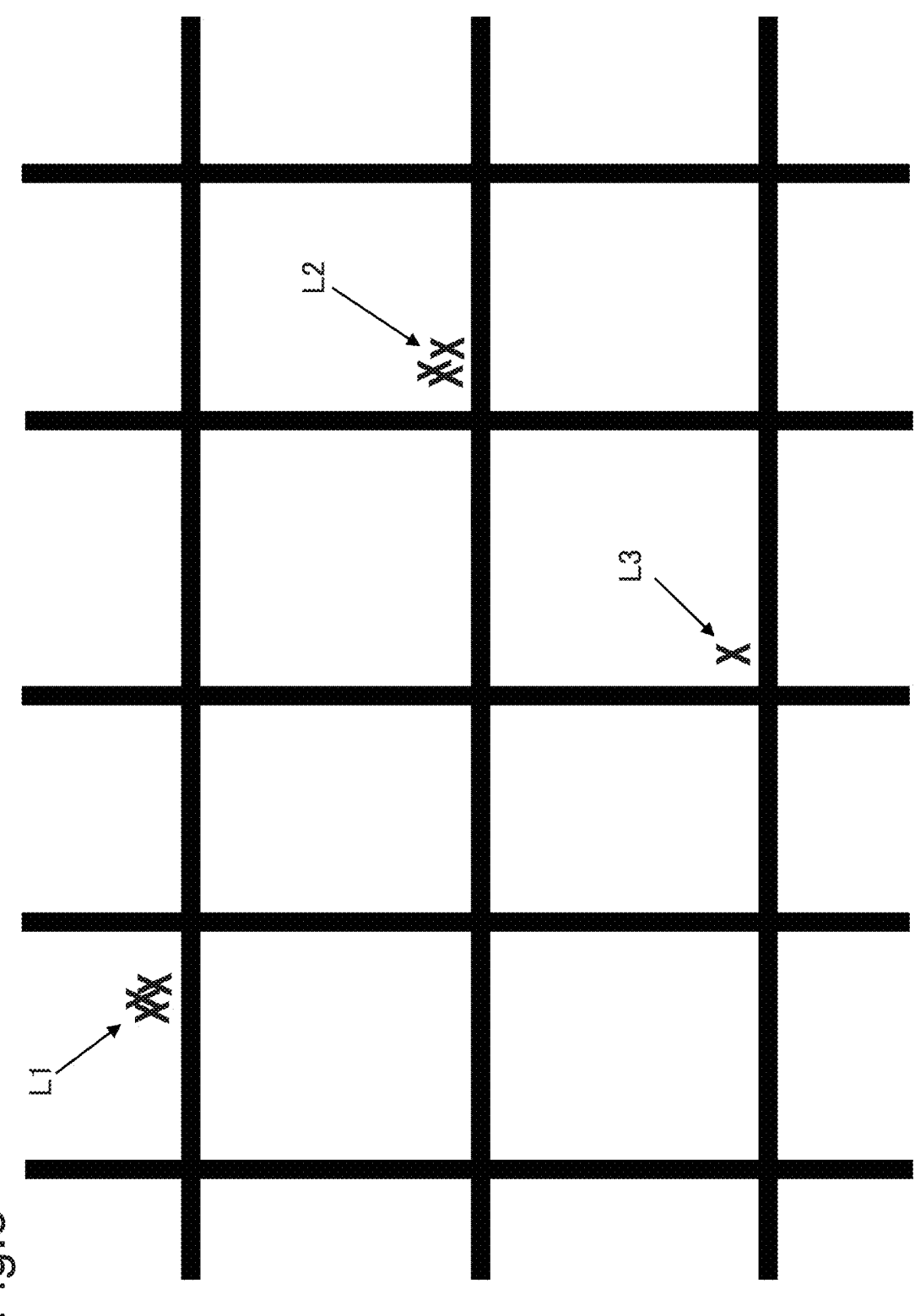
FIG. 5 is a diagram illustrating an example of a falling and the like occurrence situation map managed by an information provision system according to one example embodiment of the present disclosure.

FIG. 5 is a diagram illustrating an example of the falling and the like occurrence situation map managed by the falling and the like occurrence situation map storage means 104. An X mark in the drawing indicates the occurrence position of the falling and the like. In the example of FIG. 5, the falling and the like are observed three times at each place with reference numerals L1 and L2, and the falling and the like are observed once at a place with a reference numeral L3.

Next, the map generation means 102 generates a danger level map from the falling and the like occurrence situation map at a timing of receiving the behavior information a certain number of times after a certain period of time, and stores the generated danger level map in the danger level map storage means 105. In this case, the map generation means 102 generates a danger level map in which a place where the falling and the like are observed a predetermined number of times or more is set as an attention-seeking place in the falling and the like occurrence situation map.

Figure 6:
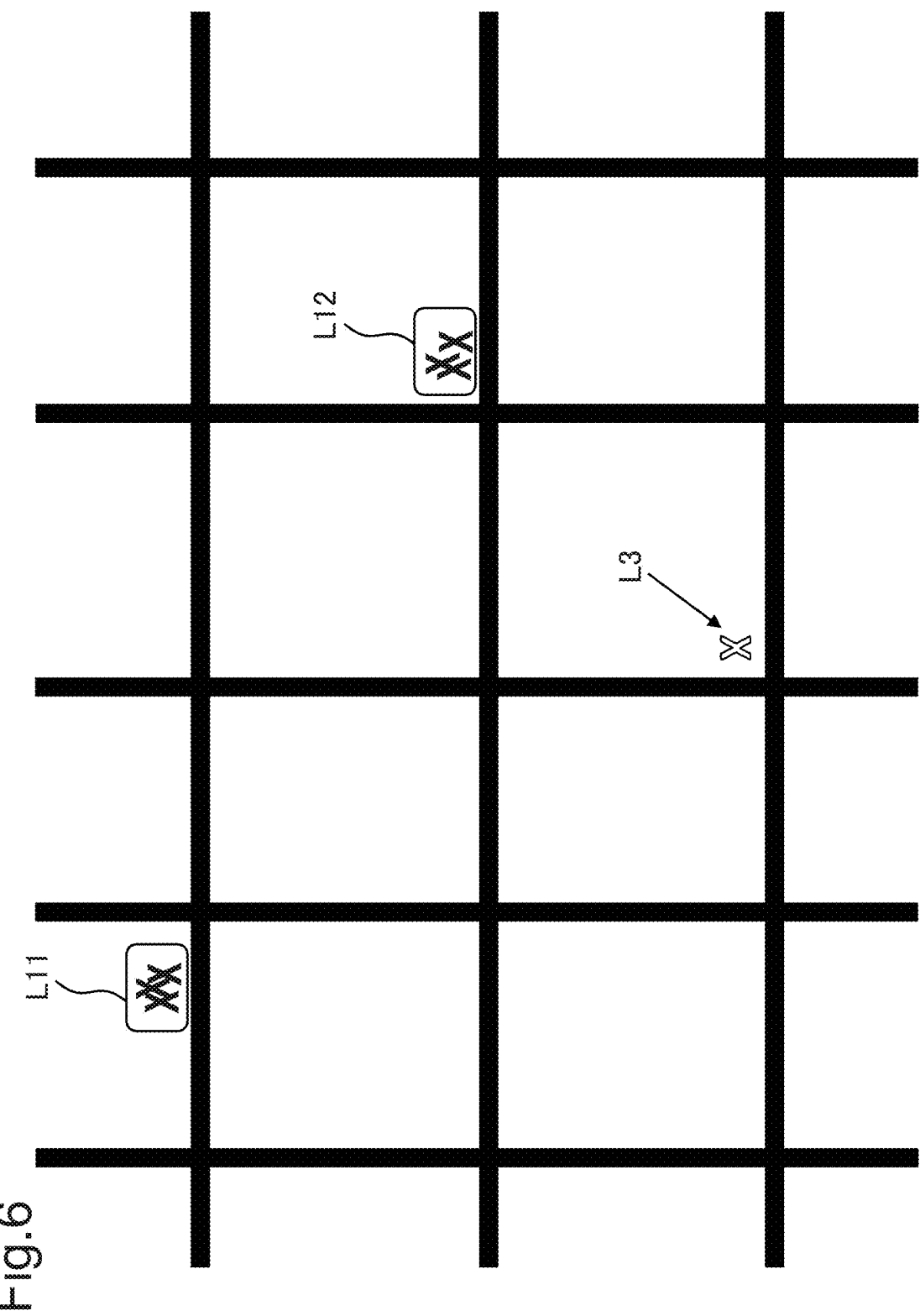
FIG. 6 is a diagram illustrating an example of a danger level map provided by the information provision system according to one example embodiment of the present disclosure.

FIG. 6 is a diagram illustrating an example of the danger level map managed by the danger level map storage means 105. In the example of FIG. 6, places L11 and L12 where the falling and the like are observed three or more times are set as the attention-seeking place in the falling and the like occurrence situation map. Therefore, in FIG. 5, the place denoted by the reference numeral L3 where the falling (a white X mark) and the like are observed once is not set as the attention-seeking place. A threshold value set as the attention-seeking place can be appropriately changed in accordance with the use and the update frequency of the danger level map.

The map provision means 103 reads the danger level map storage means 105 in response to a request from the terminal 300, and provides the map to the terminal 300. In FIG. 4, the user terminal 200 and the terminal 300 are described as separate devices, but the user terminal 200 and the terminal 300 may be the same device. In this case, the information provision system 100 provides the danger level map to the user terminal 200. The terminal 300 may be an in-vehicle terminal of a vehicle passing through the corresponding area.

Figure 7:
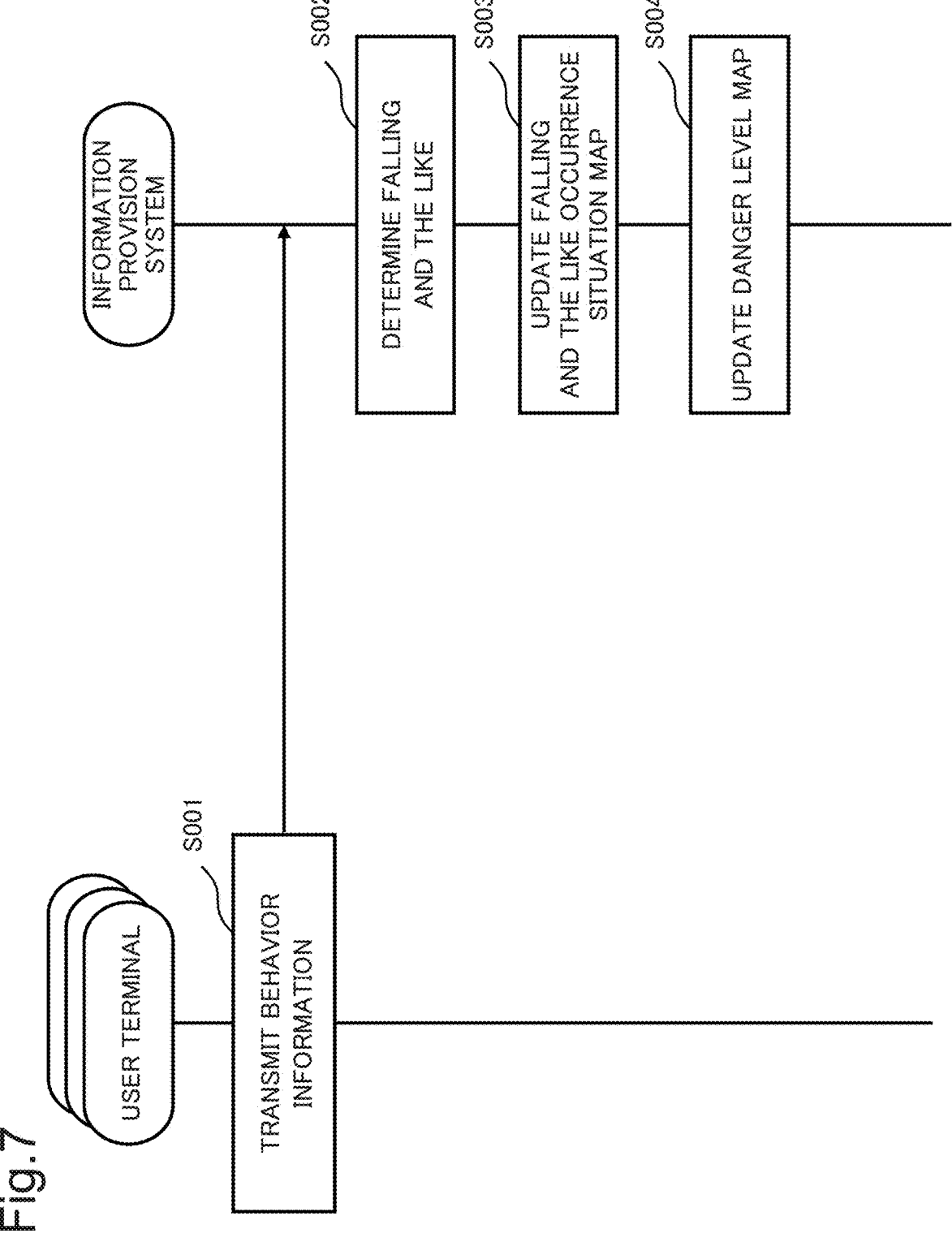
FIG. 7 is a sequence diagram illustrating an operation (an update of the danger level map) of the danger level map provision system according to one example embodiment of the present disclosure.

Next, the operation of the present example embodiment will be described in detail with reference to the drawings. FIG. 7 is a sequence diagram illustrating the operation (the update of the danger level map) of the danger level map provision system according to the first example embodiment of the present invention. Referring to FIG. 7, first, the user terminal 200 of which the user has fallen or the like transmits the behavior information with the position information to the information provision system 100 (step S001).

The information provision system 100 that has received the behavior information with the position information determines whether the motion of the user is any of falling and the like (step S002) and records the occurrence position of the received behavior information in the falling and the like occurrence situation map (step S003). For example, the information provision system 100 records a new falling and the like occurrence position in the falling and the like occurrence situation map of FIG. 5.

Next, the information provision system 100 updates the danger level map based on the updated falling and the like occurrence situation map (step S004). For example, the information provision system 100 generates a danger level map in which a position where the falling and the like occur three or more times is set as the attention-seeking place in the falling and the like occurrence situation map of FIG. 5.

Next, an operation of providing the danger level map by the information provision system 100 will be described. FIG. 8 is a sequence diagram illustrating the operation (the provision of the danger level map) of the danger level map provision system of the present example embodiment. Referring to FIG. 8, first, the terminal 300 requests the information provision system 100 to provide the danger level map (step S101). The request for the danger level map may explicitly request the transmission of the danger level map, or may be an implicit request such as a request to browse a map of an area overlapping with the danger level map.

The information provision system 100 that has received the provision request of the danger level map extracts the danger level map requested from the terminal 300 from the danger level map storage means 105 and transmits the danger level map to the terminal 300 (step S102).

The danger level map transmitted as described above is displayed on a display device of the terminal 300. In a case where a user of the terminal 300 is a pedestrian, the user refers to the number and distribution of falling warning places in the route to the destination, and pays attention when changing the route or passing through the corresponding place. In a case where the user of the terminal 300 is an administrator or the like of a road, the user performs an aid treatment in the falling warning place and attention seeking to the neighboring residents. In a case where the terminal 300 is an in-vehicle terminal, a driver of the vehicle drives more carefully at a place where the falling and the like are likely to occur. As described above, according to the present example embodiment, it is possible to improve the safety of a pedestrian moving in a predetermined area.

In the example embodiment described above, the description has been given assuming that the user terminal 200 transmits the behavior information to the information provision system 100 when observing the change in the acceleration of the predetermined magnitude or more, but the user terminal 200 may analyze the pattern of the change in the acceleration and transmit the analysis result to the information provision system 100.

In the example embodiment described above, the description has been given assuming that the information provision system 100 uniformly records the occurrence position in the falling and the like occurrence situation map based on the behavior information, but the information provision system 100 may analyze the type of falling and the like from the pattern of the change in the acceleration included in the behavior information. For example, the information provision system 100 specifies the type of falling and the like such as whether the user has fallen, slipped, or stumbled from the pattern of the change in the acceleration included in the behavior information. Then, the information provision system 100 records the occurrence position for each specified type of falling and the like in the falling and the like occurrence situation map. Then, the information provision system 100 refers to such a falling and the like occurrence situation map, and generates a danger level map representing the attention-seeking place for each type of falling and the like. For example, in a case where the falling frequently occurs at the position with the reference numeral L1 and the stumbling frequently occurs at the position with the reference numeral L2 in FIG. 5, it is possible to display the attention-seeking place L11 as a "falling-frequency place" and the attention-seeking place L11 as a "stumbling-frequency place" in the danger level map of FIG. 6. Whether the user has fallen can be determined by whether there is a movement in a height direction (a Z direction) in the user terminal. Similarly, whether the user has slipped can be determined by whether there is a period during which an exercise is performed at a speed close to a constant speed. Other behaviors can also be determined in accordance with the characteristic of each behavior.

Second Example Embodiment

Next, a second example embodiment in which the information provision system 100 performs attention seeking based on the danger level map, instead of providing the danger level map, will be described in detail with reference to the drawings. FIG. 9 is a diagram illustrating the configuration of a danger level map provision system according to the second example embodiment of the present invention. A difference from the first example embodiment illustrated in FIG. 4 is that a terminal position management server 400 is illustrated and an attention-seeking means 106 is added to an information provision system 100a. Since the other configurations are similar to those of the first example embodiment, the difference will be mainly described below.

The terminal position management server 400 manages the position of the terminal 300, and provides the position to the information provision system 100a. As such a terminal position management server 400, a server or the like for collecting the position information from an application program that is being operated in the terminal 300 and providing a service or an advertisement according to the position can be used.

The attention-seeking means 106 specifies the terminal 300 that has approached a dangerous place (the attention-seeking place) on the danger level map, based on the position information of the terminal 300 acquired from the terminal position management server 400. The attention-seeking means 106 transmits an attention-seeking message for urging attention seeking to the specified terminal 300 for the attention-seeking place.

Next, the operation of the present example embodiment will be described in detail with reference to the drawings. FIG. 10 is a sequence diagram illustrating the operation (an attention-seeking operation based on the danger level map) of the danger level map provision system of the present example embodiment. Referring to FIG. 10, first, the information provision system 100a requests the terminal position management server 400 for the position of the terminal 300 (step S201).

The terminal position management server 400 that has received the request for the position of the terminal transmits the position information of the terminal 300 to the information provision system 100a (step S202). The range of the terminal 300 of which the position information is provided to the information provision system 100a by the terminal position management server 400 may be limited to the terminal 300 or the like that has a function of receiving the attention-seeking message and is positioned in a service target area of the information provision system 100a.

The information provision system 100a that has received the position information of the terminal 300 extracts the terminal 300 approaching the attention-seeking place with reference to the danger level map (step S203). Whether to approach the attention-seeking place can be determined based on a distance between the position information of the terminal 300 and the attention-seeking place of the danger level map. Different criteria for each type such as falling may be used as a criterion for determining whether to approach the attention-seeking place.

In a more desirable mode, the information provision system 100a may change a target for the attention seeking and the contents of the attention seeking based on the movement direction and the movement speed of the terminal 300. For example, the information provision system 100a may exclude the terminal 300 away from the attention-seeking place from a transmission target of the attention-seeking message. The information provision system 100a may add the terminal 300 that is moving at a high speed such as running to the transmission target of the attention-seeking message in a mode with a higher warning effect. The movement direction and the movement speed of the terminal 300 can be calculated by repeatedly acquiring the position information from the terminal position management server 400.

Next, the information provision system 100*a* transmits the attention-seeking message for notifying the presence of the attention-seeking place to the terminal 300 approaching the attention-seeking place (step S204).

The attention-seeking message transmitted as described above is output by a display on a screen of the terminal 300 or a voice. The user of the terminal 300 pays attention when changing the route or passing through the corresponding place based on the output attention-seeking message. As described above, according to the present example embodiment, it is possible to appropriately perform the attention seeking to the user positioned in a target area.

Third Example Embodiment

Next, a third example embodiment in which a danger level map is generated using a camera image in addition to the behavior information from the user terminal 200 will be described in detail with reference to the drawings. FIG. 11 is a diagram illustrating the configuration of a danger level map provision system according to the third example embodiment of the present invention. A difference from the first example embodiment illustrated in FIG. 4 is that an information provision system 100*b* may acquire an image from a camera 500 installed around a road such as a street or a roadside, and the information provision system 100*b* generates a danger level map by using the image together. Since the other configurations are similar to those of the first example embodiment, the difference will be mainly described below.

The camera 500 is installed at any position in a generation area of the danger level map of the information provision system 100*b*, and provides a captured image to the information provision system 100*b*. As the camera 500, various security cameras or traffic flow monitoring cameras installed near intersections or roads can be used.

The map generation means 112 determines whether the motion of the user is any of falling, slipping, and stumbling (hereinafter, also referred to as "falling and the like" unless otherwise distinguished.) by using the image extracted from the camera 500, in addition to the position information and the behavior information. Here, in a case where it is determined that the motion of the user is not the falling, the slipping, or the stumbling, the map generation means 102 discards the behavior information, as with the first example embodiment.

Even in a case where there is a possibility that the motion of the user that is grasped from the behavior information is the falling, the slipping, or the stumbling, but the user who has fallen or the like does not appear in the camera image, the map generation means 112 of the present example embodiment determines that there are no falling and the like and discards the behavior information.

FIG. 12 is a diagram illustrating an example of a falling and the like occurrence situation map managed by the information provision system 100*b*. An X mark in the drawing indicates the occurrence position of the falling and the like. Among them, a white X mark indicates a place where the falling and the like are not capable of being checked by the camera 500. Therefore, in the example of FIG. 12, the falling and the like are observed three times at a place with a reference numeral L1, and the falling and the like are observed once at each place with reference numerals L2 and L3.

The map generation means 112 generates a danger level map from the falling and the like occurrence situation map updated as described above, and stores the danger level map in the danger level map storage means 105. FIG. 13 is a diagram illustrating an example of the danger level map generated from the falling and the like occurrence situation map of FIG. 12. A difference from the first example embodiment illustrated in FIG. 6 is that the attention-seeking place is only the place L11 where the falling and the like are observed three or more times in the falling and the like occurrence situation map. In the place L12, the behavior information is transmitted three times, but the place is not checked in the image of the camera 500, and thus, the number of times of the falling and the like is counted as once, and the place is not set as the attention-seeking place.

Next, the operation of the present example embodiment will be described in detail with reference to the drawings. FIG. 12 is a sequence diagram illustrating the operation (the update of the danger level map) of the danger level map provision system of the present example embodiment. A difference from the operation of the first example embodiment illustrated in FIG. 7 is that processing (step S401) is added in which the information provision system 100*b* acquires the image from the camera 500 after the determination based on the behavior information and checks whether the determination in step S002 is correct. Since other operations are similar to those of the first example embodiment, the description of the other operations will be omitted.

For example, in a case where the user accidentally drops the user terminal 200, there is a possibility that the user terminal 200 gives a report to the information provision system 100*b* that an abnormal acceleration has been detected. According to the present example embodiment, since such behavior information is treated as erroneous detection, a danger level map with a higher accuracy can be generated.

Even in the present example embodiment, as with the second example embodiment, the attention-seeking means may be added to the information provision system 100*b*. Even in this case, the information provision system 100*b* may perform the attention seeking based on the danger level map with a higher accuracy.

Fourth Example Embodiment

In the example embodiment described above, it has been described that the determination result of the falling and the like based on the behavior information transmitted from the user terminal 200 is checked using the image of the camera 500, but the occurrence of the falling and the like may be detected only by the image of the camera 500. Next, a fourth example embodiment in which a falling and the like occurrence situation is grasped based on the image acquired from the camera 500 separately from the behavior information from the user terminal 200 will be described. Since the fourth example embodiment can be enabled by the same configuration as that of the third example embodiment, a difference in the operation will be mainly described below.

FIG. 15 is a sequence diagram illustrating an additional operation (the update of a danger level map) of a danger level map provision system according to the fourth example embodiment. Referring to FIG. 15, first, the information provision system 100b acquires image data from the camera 500 (step S501).

The information provision system 100b performs object recognition processing on the image acquired from the camera 500, and determines whether a person appearing in the image has fallen or the like (step S502).

In a case where the information provision system 100b determines that the person appearing in the image has fallen or the like, the information provision system specifies the position of the person who has fallen based on the position of the camera 500 that is a transmission source of the image data or a position in the image, and records the position in a falling and the like occurrence situation map (step S502).

FIG. 16 is a diagram illustrating an example of the falling and the like occurrence situation map managed by the information provision system 100b. An Xc mark in the drawing indicates the occurrence position of the falling and the like detected by the image data of the camera 500. As illustrated in FIG. 16, according to the present example embodiment, it is possible to grasp the occurrence of the falling and the like even in a place where there are few pedestrians carrying the user terminal 200.

The map generation means 112 generates a danger level map from the falling and the like occurrence situation map updated as described above, and stores the danger level map in the danger level map storage means 105. FIG. 17 is a diagram illustrating an example of a danger level map generated from the falling and the like occurrence situation map of FIG. 16. A difference from the first example embodiment illustrated in FIG. 6 is that an attention-seeking place L14 due to the falling and the like detected by the image data of the camera 500 is added.

As described above, not only the behavior information but also the image data of the camera 500 can be used to generate and update the danger level map.

Although the example embodiments of the present invention have been described above, the present invention is not limited to the example embodiments described above, and further modifications, substitutions, and adjustments can be made without departing from the basic technical idea of the present invention. For example, the network configuration, the configuration of each element, and the expression form of data illustrated in the drawings are examples for easy understanding of the present invention, and are not limited to the configurations illustrated in the drawings.

For example, in the first to fourth example embodiments described above, an example has been described in which the danger level map is generated based on the falling and the like occurrence situation in an urban area, but the application range of the present invention is not limited to such an application. For example, the present invention can also be suitably applied to attention seeking at the time of road surface freezing or an accumulation of snow in the urban area. In this case, by starting the collection of the behavior data and starting the update of the falling and the like occurrence situation map using, as a trigger, a forecast announcement or an observation of the road surface freezing or the accumulation of snow, it is possible to generate the danger level map with a higher accuracy at the time of the road surface freezing or at a time of snowfall.

In the example embodiments described above, it has been described that any one of the falling, the slipping, and the stumbling of the pedestrian is detected, but the determination can be made by excluding any one of the falling, the slipping, and the stumbling in a specific area. For example, in stairs and an escalator in a building, a similar acceleration to that of the falling, the slipping, and the stumbling may be observed. Although a method for identifying the accelerations can also be adopted on the information provision system side, a configuration for preventing the user terminal 200 from transmitting the behavior information in these areas can be adopted. Specifically, the user terminal 200 may be prevented from transmitting the behavior information based on the position information of the user terminal 200 (whether the user terminal is within a specific area) and the explicit manipulation of the user (setting whether to transmit the behavior information).

As another modification example, a mode can also be adopted in which the map generation means 102 of the information provision system removes the behavior information from the user terminal 200 in a specific area. The position information of the user terminal 200 can be used as a method for determining whether the behavior information is from this specific area.

The specific area described above may include a private land such as a parking lot of a store in addition to the inside of a building. On the contrary, even in a place that is not the public road, an area for a parking lot managed by a local government such as a public facility or other facilities can be included in the specific area.

The present invention can also be suitably applied to an application in which the attention seeking to a user using a mountain trail, a hiking course, or the like is performed. In this case, the present invention can be used to share a place where a climber or a hiker previously using the mountain trail, the hiking course, or the like has fallen or the like, or as a system for performing the attention seeking.

Hardware Configuration

In each example embodiment of the present disclosure, each constituent of each device indicates a block of a functional unit. A part or all of each constituent of each device is enabled by, for example, any combination of an information processing device 900 and a program as illustrated in FIG. 18. FIG. 18 is a block diagram illustrating an example of the hardware configuration of the information processing device 900 that enables each constituent of each device. The information processing device 900 has the following configuration as an example.

Central processing unit (CPU) 901
Read only memory (ROM) 902
Random access memory (RAM) 903
Program 904 loaded to RAM 903
Storage 905 device storing program 904
Drive device 907 for performing reading and writing of recording medium 906
Communication interface 908 connected to communication network 909
Input/output interface 910 that performs input and output of data
Bus 911 connecting each constituent
Each constituent of each device in each example embodiment is enabled by the CPU 901 acquiring and executing the program 904 for enabling such functions. That is, the CPU 901 of FIG. 18 may execute a data collection program and a map update program to perform update processing of each calculation parameter held in the RAM 903, the storage device 905, or the like. The program 904 for enabling the function of each constituent of each device is stored in the storage device 905 or the ROM 902 in advance, for example, and is read by the CPU 901 as necessary. The program 904 may be supplied to the CPU 901 via the communication network 909, or may be stored in advance in the recording medium 906, and the drive device 907 may read the program and supply the program to the CPU 901.

The program 904 may display the processing result including the intermediate state for each stage via the display device as necessary, or may communicate with the outside via the communication interface. The program 904 can be recorded in a computer-readable (non-transitory) recording medium.

A method for enabling each device may have various modification examples. For example, each device may be enabled by any combination of the individual information processing device 900 and the individual program for each constituent. A plurality of constituents included in each device may be enabled by any combination of one information processing device 900 and one program. That is, each unit (processing means and function) of the information provision system described in the first to fourth example embodiments described above can be enabled by a computer program for causing a processor mounted on the information provision system to execute each processing piece described above using hardware.

A part or all of each constituent of each device is enabled by another general-purpose or dedicated circuit, processor, or the like, or a combination of the above. A part or all of each constituent of each device may be configured by a single chip or may be configured by a plurality of chips connected via a bus.

A part or all of each constituent of each device may be enabled by a combination of the circuit or the like described above and a program.

In a case where a part or all of each constituent of each device is enabled by a plurality of information processing devices, circuits, or the like, the plurality of information processing devices, circuits, or the like may be arranged in a centralized manner or in a distributed manner. For example, the information processing device, the circuit, or the like may be enabled as a mode in which each of a client and server system, a cloud computing system, and the like is connected via a communication network.

Each of the example embodiments described above is a preferred example embodiment of the present disclosure, and the scope of the present disclosure is not limited only to each of the example embodiments. That is, it is possible for those of ordinary skill in the art to make corrections and substitutions of the example embodiments without departing from the gist of the present disclosure, and to construct a mode in which various modifications are made.

A part or all of the example embodiments described above may be described as the following Supplementary Notes, but the present disclosure is not limited to the following Supplementary Notes.

Supplementary Note 1

An information provision system, including:

a collection means for collecting, from a user terminal, position information of the user terminal and behavior information indicating a behavior accompanied with a predetermined or higher acceleration of the user terminal;

a map generation means for generating a danger level map representing a position in which the collected behavior information is observed on a predetermined map; and a map provision means for providing the danger level map to a predetermined terminal.

Supplementary Note 2

A configuration can be adopted in which the behavior information collected by the information provision system described above is information indicating a temporal change in acceleration that occurs in the user terminal and that is measured by an acceleration sensor provided in the user terminal, and the map generation means of the information provision system generates a danger level map representing a position in which falling of a user carrying the user terminal, slipping of the user, or stumbling of the user has occurred, based on the change in the acceleration.

Supplementary Note 3

A configuration can be adopted in which the map generation means of the information provision system described above generates the danger level map based on a number of times that behavior information of a plurality of user terminals is observed in a predetermined period.

Supplementary Note 4

A configuration can be adopted in which the information provision system described above starts collection of the behavior information using, as a trigger, a forecast announcement or an observation of road surface freezing or a snowfall in a predetermined area associated to the map, and generates a danger level map at time of the road surface freezing or the snowfall.

Supplementary Note 5

A configuration can be adopted in which the information provision system described above is capable of acquiring an image form a camera installed around a road, and the map generation means generates a danger level map representing a position in which the falling of the user carrying the user terminal, the slipping of the user, or the stumbling of the user has occurred, based on the image of the camera installed around the road.

Supplementary Note 6

A configuration can be adopted in which the map generation means of the information provision system described above determines the occurrence of the falling of the user, the slipping of the user, or the stumbling of the user by using both of the behavior information and the image from the camera.

Supplementary Note 7

A configuration can be adopted in which the information provision system described above further includes an attention-seeking means for transmitting an attention-seeking message to a user terminal heading to a dangerous place on the danger level map, based on the danger level map.

Supplementary Note 8

A user terminal, including:

a position information acquisition means; and an acceleration sensor, in which position information and behavior information indicating a behavior accompanied with a predetermined or higher acceleration are transmitted to the information provision system described above.

Supplementary Note 9

A danger level map provision system, including:
a user terminal including a position information acquisition means and an acceleration sensor, and transmitting position information and behavior information indicating a behavior accompanied with a predetermined or higher acceleration to the information provision system according to any one of Supplementary Notes 1 to 5; and
the information provision system including:
a collection means for collecting, from the user terminal, the position information of the user terminal and the behavior information indicating the behavior accompanied with the predetermined or higher acceleration of the user terminal;
a map generation means for generating a danger level map representing a position in which the collected behavior information is observed on a predetermined map; and
a map provision means for providing the danger level map to a predetermined terminal.

Supplementary Note 10

An information provision method, including:
collecting, from a user terminal, position information of the user terminal and behavior information indicating a behavior accompanied with a predetermined or higher acceleration of the user terminal;
generating a danger level map representing a position in which the collected behavior information is observed on a predetermined map; and
providing the danger level map to a predetermined terminal.

Supplementary Note 11

A computer-readable recording medium recording a program for causing an information provision system to execute:
processing of collecting, from a user terminal, position information of the user terminal and behavior information indicating a behavior accompanied with a predetermined or higher acceleration of the user terminal;
processing of generating a danger level map representing a position in which the collected behavior information is observed on a predetermined map; and
processing of providing the danger level map to a predetermined terminal.

The modes of Supplementary Notes 9 to 11 can be expanded to the forms of Supplementary Notes 2 to 7, as with Supplementary Note 1.

It is to be noted that each disclosure of the patent literature described above is incorporated herein by reference, and can be used as the basis or a part of the present invention as necessary. Within the category of the entire disclosure (including the claims) of the present invention, it is possible to change and adjust the example embodiments or examples further based on the basic technical idea. Various combinations or selections (including partial deletions) of various disclosure elements (including each element of each claim, each element of each example embodiment or example, each element of each drawing, and the like) can be made within the category of the disclosure of the present invention. That is, it is obvious that the present invention includes various modifications and corrections that can be made by those of ordinary skill in the art, in accordance with the entire disclosure including the claims and the technical idea. In particular, for the numerical ranges described herein, any numerical value or sub-range included within the range is to be construed as being specifically described, even when not stated otherwise. It is also assumed that using a part or all of the matters disclosed in the cited literatures in combination with the matters described in the present specification, as a part of the disclosure of the present invention, in accordance with the gist of the present invention, as necessary, is also included in the matters disclosed in the present application.

REFERENCE SIGNS LIST

10, 100, 100a, 100b information provision system
11, 101 collection means
12, 102, 112 map generation means
13, 103 map provision means
104 falling and the like occurrence situation map storage means
105 danger level map storage means
106 attention-seeking means
200 user terminal
201 position information specifying means
202 acceleration sensor
203 transmission means
300 terminal
400 terminal position management server
500 camera
900 information processing device
901 central processing unit (CPU)
902 read only memory (ROM)
903 random access memory (RAM)
904 program
905 storage device
906 recording medium
907 drive device
908 communication interface
909 communication network
910 input/output interface
911 bus

What is claimed is:
1. An information provision system, comprising:
at least one memory configured to store instructions; and
at least one processor configured to execute the instructions to:
collect, from a user terminal having an acceleration sensor, position information of the user terminal and behavior information indicating a movement behavior of the user terminal moving at an acceleration higher than a predetermined value, wherein a transmission of the behavior information from the user terminal is suppressed when the user terminal is located within predetermined indoor areas;
acquire an image from a camera installed around a road;
determine an occurrence of a user falling, slipping, or stumbling based on the behavior information and the image;
generate a danger level map based on the occurrence of the user falling, slipping, or stumbling, the danger level map indicating an attention-seeking place based on a position corresponding to the occurrence of the user falling, slipping, or stumbling on a predetermined map; and provide the danger level map to another user terminal.

2. The information provision system according to claim 1, wherein the behavior information indicates a temporal change in acceleration that occurs in a movement behavior of the user terminal, the temporal change in the acceleration being measured by the acceleration sensor, and the at least one processor is further configured to execute the instructions to:

generate the danger level map indicating the position corresponding to the occurrence of the user falling, slipping, or stumbling based on the temporal change in the acceleration.

3. The information provision system according to claim 1, wherein the at least one processor is further configured to execute the instructions to:

generate the danger level map based on a number of times that behavior information of a plurality of user terminals is observed in a predetermined period.

4. The information provision system according to claim 1, wherein the at least one processor is further configured to execute the instructions to:

collect the behavior information based on a forecast announcement, an observation of road surface freezing in a predetermined area associated with the predetermined map, or an observation of snowfall in the predetermined area associated with the predetermined map, and generate the danger level map indicating the attention-seeking place at a time of the observation of the road surface freezing or the observation of the snowfall.

5. The information provision system according to claim 1, wherein the at least one processor is further configured to execute the instructions to:

transmit an attention-seeking message to the another user terminal when the another user terminal is heading to the attention-seeking place on the danger level map.

6. An information provision method, comprising:

collecting, from a user terminal having an acceleration sensor, position information of the user terminal and behavior information indicating a movement behavior of the user terminal moving at an acceleration higher than a predetermined value, wherein a transmission of the behavior information from the user terminal is suppressed when the user terminal is located within predetermined indoor areas;

acquiring an image from a camera installed around a road;

determining an occurrence of a user falling, slipping, or stumbling based on the behavior information and the image;

generating a danger level map based on the occurrence of the user falling, slipping, or stumbling, the danger level map indicating an attention-seeking place based on a position corresponding to the occurrence of the user falling, slipping, or stumbling on a predetermined map; and providing the danger level map to another user terminal.

7. A non-transitory computer-readable recording medium recording a program for causing an information provision system to execute:

processing of collecting, from a user terminal having an acceleration sensor, position information of the user terminal and behavior information indicating a movement behavior of the user terminal moving at an acceleration higher than a predetermined value, wherein a transmission of the behavior information from the user terminal is suppressed when the user terminal is located within predetermined indoor areas;

processing of acquiring an image from a camera installed around a road;

processing of determining an occurrence of a user falling, slipping, or stumbling based on the behavior and the image;

processing of generating a danger level map based on the occurrence of the user falling, slipping, or stumbling, the danger level map indicating an attention-seeking place based on a position corresponding to the occurrence of the user falling, slipping, or stumbling on a predetermined map; and processing of providing the danger level map to another user terminal.

* * * * *